US008545336B2

(12) United States Patent
Miyanaga

(10) Patent No.: US 8,545,336 B2
(45) Date of Patent: Oct. 1, 2013

(54) STORAGE MEDIUM STORING GAME PROGRAM, GAME APPARATUS AND GAME CONTROLLING METHOD

(75) Inventor: Makoto Miyanaga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 728 days.

(21) Appl. No.: 12/618,024

(22) Filed: Nov. 13, 2009

(65) Prior Publication Data
US 2010/0240460 A1 Sep. 23, 2010

(30) Foreign Application Priority Data

Mar. 18, 2009 (JP) ................................. 2009-065846

(51) Int. Cl.
*A63F 9/24* (2006.01)
(52) U.S. Cl.
USPC .......... 463/43; 463/7; 463/9; 463/29; 463/36; 463/39; 463/40; 345/156; 345/161; 345/184
(58) Field of Classification Search
USPC ............... 463/2, 5, 25, 29–32, 36–42, 49–57, 463/7–9, 161, 184, 156, 160, 170; 345/156, 345/161, 184
See application file for complete search history.

(56) References Cited

U.S. PATENT DOCUMENTS 6,324,584 B1 * 11/2001 Mandalia ....................... 709/238
2005/0272504 A1 * 12/2005 Eguchi et al. .................. 463/40

FOREIGN PATENT DOCUMENTS

JP 2004-223110 8/2004

OTHER PUBLICATIONS

Nintendo Wii Sports, Wikipedia encyclopedia, Jun. 27, 2012 pp. 1-12.*

* cited by examiner

*Primary Examiner* — Sunit Pandya
(74) *Attorney, Agent, or Firm* — Nixon & Vanderhye, P.C.

(57) ABSTRACT

A game apparatus includes a CPU, and in a case that two or more players play a game in turn, when a game as to a certain player is ended, the CPU selects a player for a next game out of registered already-selected players who have already been selected to participate in the game or not-yet-selected players who have not yet been selected to participate in the game according to an instruction by the player. If the not-yet-selected player is selected as a player for the next game, the player is registered as an already-selected player.

13 Claims, 17 Drawing Sheets

STORAGE MEDIUM STORING GAME PROGRAM, GAME APPARATUS AND GAME CONTROLLING METHOD

CROSS REFERENCE OF RELATED APPLICATION

The disclosure of Japanese Patent Application No. 2009-65846 is incorporated herein by reference.

BACKGROUND OF THE INVENTION

1. Field of the Invention

This invention relates a storage medium storing a game program, a game apparatus and a game controlling method. More specifically, the present invention relates to a storage medium storing a game program, a game apparatus and a game controlling method capable of making a plurality of players participate in a game.

2. Description of the Related Art

One example of the related art is disclosed in Japanese Patent Application Laid-Open No. 2004-223110 [A63F 13/00, A63F 13/10] (Document 1) laid-open on Aug. 12, 2004. In the game apparatus of the Document 1, in a game in which a plurality of players participate, before the game is started, the number of players playing the game is decided (registered), and the game is executed according to the registered number.

However, in game apparatus of the Document 1, after the game is started, unless the number of players playing the game is decide again by restarting the game, such as resetting, or the like, it is impossible to make another player participate in the game beyond the registered number. That is, it is impossible to increase the number of players to be participated in proceeding. Thus, there is a room for improvement with respect to degree of flexibility when a player is participated in the game.

SUMMARY OF THE INVENTION

Therefore, it is a primary object of the present invention to provide a novel storage medium storing a game program, a novel game apparatus and a novel game controlling method.

Furthermore, another object of the present invention is to provide a storage medium storing a game program, a game apparatus and a game controlling method which are able to improve a degree of flexibility when a player is participated in the game.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a storage medium storing a game program, and a game program causes a computer to execute a player selecting step for selecting a game player according to an operation by a player; a player registering step for registering at least the player selected by the player selecting step as an already-selected player; a game executing step for executing a game as to the player selected by the player selecting step; and a next-game-player selecting step for selecting, when the game executed by the game executing step is ended, and a next game is started, a player for the next game from the already-selected player who has been registered by the player registering step and a not-yet-selected player who has not yet been selected by the player selecting step according to an operation by the player. The player registering step registers, when the not-yet-selected player is selected by the next-game-player selecting step, the not-yet-selected player as the already-selected player.

In the first invention, a game program causes a computer to execute following steps. A player selecting step (40, S13, S83) selects a game player according to an operation by a player. A player registering step (40, S15, S91) registers at least the player selected by the player selecting step as an already-selected player. A game executing step (40, S51, S57, S63, S67) executes a game as to the player selected by the player selecting step. A next-game-player selecting step (40, S73, S77) selects, when the game executed by the game executing step is ended ("YES" in S55, S67), and a next game is started, a player for the next game from the already-selected player who has been registered by the player registering step and a not-yet-selected player who has not yet been selected by the player selecting step according to an operation by the player. The player registering step registers, when the not-yet-selected player is selected by the next-game-player selecting step ("YES" in S77), the not-yet-selected player as the already-selected player.

According to the first invention, when the game is ended, the not-yet-selected player is selected as well as the registered already-selected player is selected as a player for a next game, and the not-yet-selected player selected as a player for the next game can be registered as an already-selected player, capable of addition of the player without restarting the main game program. That is, it is possible to improve a degree of flexibility when the player is participated in the game.

A second invention is according to the first invention, and the game program causes a computer to further execute: an already-selected-player-number determining step for determining whether or not the number of already-selected players is a maximum number when the player registering step registers the not-yet-selected player as the already-selected player; and an erasing step for erasing the one already-selected player from the registered already-selected player according to a first predetermined rule when the already-selected-player-number determining step determines that the number of already-selected players is the maximum number.

In a second invention, an already-selected-player-number determining step (40, S85) determines whether or not the number of already-selected players is a maximum number when the player registering step registers the not-yet-selected player as the already-selected player ("YES" in S83). An erasing step (40, S87) erases the one already-selected player from the registered already-selected player according to a first predetermined rule when the already-selected-player-number determining step determines that the number of already-selected players is the maximum number ("YES" in S85).

According to the second invention, in a case that the already-selected player is above the maximum number, the registered already-selected player is erased according to the first predetermined rule, capable of surely registering the not-yet-selected player which is currently selected as an already-selected player.

A third invention is according to the second invention, and the erasing step erases the already-selected player having the oldest playing time of a previous game from the registered already-selected player when the already-selected-player-number determining step determines that the number of already-selected players is the maximum number.

In the third invention, the erasing step erases the already-selected player having the oldest playing time of a previous game from the registered already-selected player when that the number of already-selected players is the maximum number is determined. That is, the already-selected player who has not played a game for a long time is erased.

According to the third invention, similar to the second invention, it is possible to surely register the not-yet-selected player which is currently selected as an already-selected player.

A fourth invention is according to the first invention, and the game program causes a computer to further execute a next-game-player-selection-screen displaying step for displaying a next-game-player selection screen to select the player for the next game from the already-selected player or the not-yet-selected player when the game executed by the game executing step is ended.

In the fourth invention, a next-game-player-selection-screen displaying step (40, S71) displays a next-game-player selection screen (600) to select the player for the next game from the already-selected player or the not-yet-selected player when the game executed by the game executing step is ended ("YES" in S55, S67).

In the fourth invention, the user is caused to decide whether to select the already-selected player or the not-yet-selected player on the one screen, capable of improving usability.

A fifth invention is according to the fourth invention, and the game player selection screen includes a first image to select the already-selected player and a second image to select the not-yet-selected player, and the game program causes a computer to further execute a not-yet-selected-player-selection-screen displaying step for displaying a not-yet-selected-player selection screen to select the not-yet-selected player when the second image is selected, and the next-game-player selecting step selects the not-yet-selected player selected according to an operation by the player as the player for the next game by utilizing the not-yet-selected-player selection screen displayed by the not-yet-selected-player-selection-screen displaying step.

In the fifth invention, the game player selection screen includes a first image (OBJ) to select the already-selected player and a second image (610) to select the not-yet-selected player. A not-yet-selected-player-selection-screen displaying step (40, S81) displays a not-yet-selected-player selection screen (200) to select the not-yet-selected player when the second image is selected ("YES" in S77). Accordingly, the next-game-player selecting step selects the not-yet-selected player selected according to an operation by the player as the player for the next game by utilizing the not-yet-selected-player selection screen displayed by the not-yet-selected-player-selection-screen displaying step.

According to the fifth invention, the images to select the already-selected player or the not-yet-selected player are displayed, and therefore, it is possible to select the not-yet-selected player as a player for the next game with a simple operation, and moreover register it as an already-selected player.

A sixth invention is according to the fifth invention, and selectable-player data as to a selectable player which has previously been registered is stored in a storing means, and the not-yet-selected-player-selection-screen displaying step displays an image corresponding to the selectable player indicated by the selectable-player data stored in the storing means as the not-yet-selected player on the not-yet-selected-player selection screen.

In the sixth invention, a storing means (42*e*, 46) stores selectable-player data (702*c*) as to a selectable player which has previously been registered. The not-yet-selected-player-selection-screen displaying step displays an image corresponding to the selectable player indicated by the selectable-player data stored in the storing means as the not-yet-selected player on the not-yet-selected-player selection screen.

According to the sixth invention, only an image corresponding to the selectable player is displayed on the not-yet-selected-player selection screen, capable of selecting a desired player with ease.

A seventh invention is according to the sixth invention, and a game program causes a computer to further execute an inactivating step for making the player selected by the player selecting step and the not-yet-selected player selected by the next-game-player selecting step unselectable out of the selectable player; and the not-yet-selected-player-selection-screen displaying step displays on the not-yet-selected-player selection screen an image corresponding to the selectable player except for the player who is made unselectable by the inactivating step.

In the seventh invention, an inactivating step (40, S17, S93) makes the player selected by the player selecting step and the not-yet-selected player selected by the next-game-player selecting step unselectable out of the selectable player. That is, the already-selected player is made unselectable. The not-yet-selected-player-selection-screen displaying step displays on the not-yet-selected-player selection screen an image corresponding to the selectable player except for the player who is made unselectable by the inactivating step.

According to the seventh invention, the already-selected player is never displayed on the not-yet-selected-player selection screen, and therefore, it is possible to prevent the same player being redundantly registered as an already-selected player, and to display only the images of the necessary players.

An eighth invention is according to the fifth invention, and the first image includes already-selected-player images each corresponding to the already-selected player, the next-game-player-selection-screen displaying step arranges and displays the already-selected-player images in an order according to a second predetermined rule, and the game program causes the computer to further execute a sorting step for sorting the already-selected-player images according to the second predetermined rule when the game executed by the game executing step is ended.

In the eighth invention, the first image includes already-selected-player images each corresponding to the already-selected player. The next-game-player-selection-screen displaying step arranges and displays the already-selected-player images in an order according to a second predetermined rule. The sorting step (40, S69) sorts the already-selected-player images according to the second predetermined rule when the game executed by the game executing step is ended.

According to the eighth invention, the already-selected-player images are arranged and displayed according to the second predetermined rule, so that in a case of performing the game by a plurality of players, when the next player, that is, the player to be changed is decided, it is possible to relatively easily perform the selection.

A ninth invention is according to the eighth invention, and the next-game-player-selection-screen displaying step displays the already-selected-player images in early order at time by which a previous game is played.

In the ninth invention, the next-game-player-selection-screen displaying step displays the already-selected-player images in early order at time by which a previous game is played. Such a display becomes an index to select the next player, that is, the player to be changed.

According to the ninth invention, in a case of playing the game by a plurality of players, it is possible to easily select a player to be changed.

A tenth invention is according to the first invention, and selectable-player data as to a selectable player which has already been registered is stored in a storing means, the player selecting step selects a player from the selectable player, and the next-game-player selecting step selects the not-yet-selected player from the selectable player.

In the tenth invention, a storing means (42e, 46) stores selectable-player data (702c) as to a selectable player which has already been registered. The player selecting step selects a player from the selectable player, and similarly, the next-game-player selecting step selects the not-yet-selected player from the selectable player.

According to the tenth invention, the player or the not-yet-selected player is selected from the selectable player previously registered, capable of eliminating inconvenience of selection of the unselectable player.

An eleventh invention is a game apparatus, and comprises a player selecting means for selecting a game player according to an operation by a player; a player registering means for registering at least the player selected by the player selecting means as an already-selected player; a game executing means for executing a game as to the player selected by the player selecting means; and a next-game-player selecting means for selecting, when the game executed by the game executing means is ended, and a next game is started, a player for the next game from the already-selected player who has been registered by the player registering means and a not-yet-selected player who has not yet been selected by the player selecting means according to an operation by the player, wherein the player registering means registers, when the not-yet-selected player is selected by the next-game-player selecting means, the not-yet-selected player as the already-selected player.

In the eleventh invention as well, similar to the first invention, it is possible to improve a degree of flexibility when the player is participated in the game.

A twelfth invention is a game controlling method, and includes following steps of: (a) selecting a game player according to an operation by a player; (b) registering at least the player selected by the step (a) as an already-selected player; (c) executing a game as to the player selected by the step (a); and (d) selecting, when the game executed by the step (c) is ended, and a next game is started, a player for the next game from the already-selected player who has been registered by the step (b) and a not-yet-selected player who has not yet been selected by the step (a) according to an operation by the player, wherein the step (b-1) registers, when the not-yet-selected player is selected by the (d) step, the not-yet-selected player as the already-selected player.

In the twelfth invention as well, similar to the first invention, it is possible to improve a degree of flexibility when the player participates in the game.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
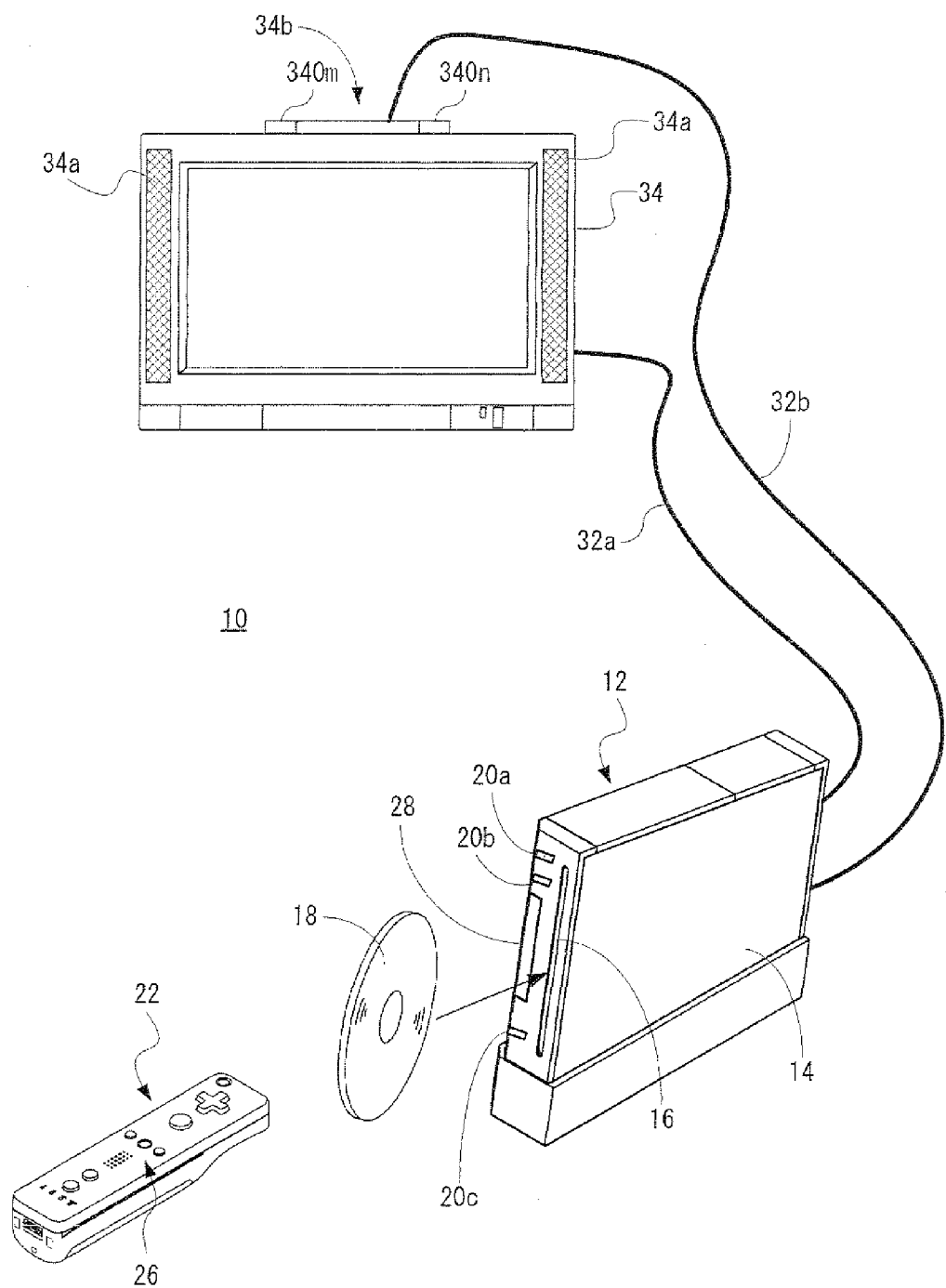
FIG. 1 is an illustrative view showing one embodiment of a game system of the present invention.

Referring to FIG. 1, a game system 10 of one embodiment of the present invention includes a video game apparatus (hereinafter referred to as "game apparatus") 12 and a controller 22. Although illustration is omitted, the game apparatus 12 of this embodiment is designed such that it can be connected to four controllers 22 at the maximum. Furthermore, the game apparatus 12 and the respective controllers 22 are connected by a wireless manner. The wireless communication is executed according to a Bluetooth (registered trademark) standard, for example, but may be executed by other standards, such as infrared rays, a wireless LAN. In addition, it may be connected by a wire.

The game apparatus 12 includes a roughly rectangular parallelepiped housing 14, and the housing 14 is furnished with a disk slot 16 on a front face. An optical disk 18 storing game program, etc. as one example of an information storage medium is inserted through the disk slot 16 to be loaded into a disk drive 54 (see FIG. 2) within the housing 14. Although illustration is omitted, around the disk slot 16, an LED and a light guide plate are arranged such that the LED of the disk slot 16 can light on or off in accordance with various processing.

Furthermore, on the upper front face of the housing 14 of the game apparatus 12, a power button 20a and a reset button 20b are provided, and an eject button 20c is provided below them. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Moreover, the memory card may be utilized as a backup memory for the internal memory. In addition, in the game apparatus 12, other applications except for the game may be executed, and in such a case, data of the other applications can be stored in the memory card.

Here, a general-purpose SD card can be employed as a memory card, but other general-purpose memory cards, such as a memory stick, a multimedia card (registered trademark) can be employed.

Although omitted in FIG. 1, the game apparatus 12 has an AV cable connector 58 (FIG. 2) on the back face of the housing 14, and by utilizing the AV cable connector 58, the monitor 34 and a speaker 34a are connected within the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 34, and stereo game sound, such as a game music, a sound effect, etc. is output from the right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights ahead of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the input means 26, a game or other application is started. Besides the operation of the input means 26, by moving the controller 22 itself, it is possible to move a moving image object (player object) in different directions or change a perspective of the user (camera position) in a 3-dimensional game world.

Here, programs of the video game and other applications may be stored (installed) in an internal memory (flash memory 42 (see FIG. 2)) of the game apparatus 12 so as to be executed from the internal memory. In such a case, programs stored in a storage medium like an optical disk 18 may be installed onto the internal memory, or downloaded programs may be installed onto the internal memory.

Figure 2:
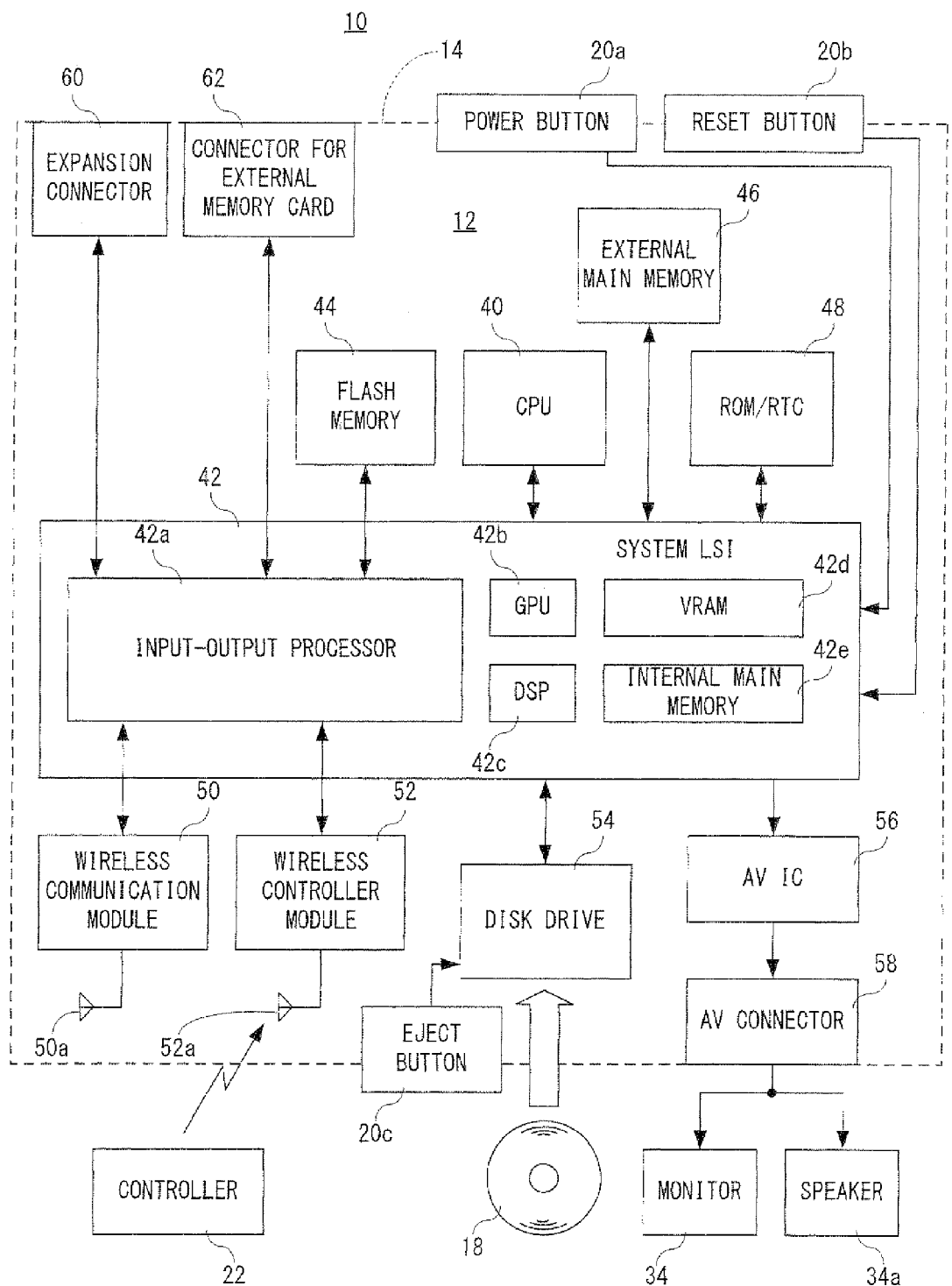
FIG. 2 is a block diagram showing an electric configuration of the game system shown in FIG. 1.

FIG. 2 is a block diagram showing an electric configuration of the video game system 10 in FIG. 1 embodiment. Although illustration is omitted, the respective components within the housing 14 are mounted on a printed board. As shown in FIG. 2, the game apparatus 12 has a CPU 40 functioning as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area or a buffer area of the CPU 40 by storing programs like a game program, etc., and various data. The ROM/RTC 48, a so-called boot ROM, is incorporated with a program for activating the game apparatus 12, and provided with a time circuit for counting a time. The disk drive 54 reads a program, image data, sound data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d, and an internal main memory 42e. Although illustration is omitted, these are connected with each other by internal buses. The input-output processor (I/O processor) 42a executes transmission and reception of data, downloads of data, and so forth. A detailed description is made later as to transmission and reception and download of the data.

The GPU 42b is made up of a part of a rendering means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire the data (image data: data such as polygon data, texture data, etc.) required to execute the construction command. Additionally, the CPU 40 writes the image data required for drawing to the VRAM 42d via the GPU 42b. The GPU 42b accesses the VRAM 42d to create game image data for drawing.

In this embodiment, a description is made on a case that the GPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music which are to be output from speaker 34a by means of the sound data and the sound wave (tone) data which are stored in the internal main memory 42e and the external main memory 46.

The game image data and audio data which are generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a wireless communication module 50, a wireless controller module 52, an expansion connector 60, and a connector for external memory card 62. The wireless communication module 50 is connected with an antenna 50a, and the wireless controller module 52 is connected with an antenna 52a.

Although illustration is omitted, the input-output processor 42a can communicate with other game apparatuses and various servers to be connected to a network via the wireless communication module 50. It should be noted that it is possible to directly communicate with other game apparatuses without going through the network. The input-output processor 42a periodically accesses the flash memory 44 to detect the presence or absence of data required to be transmitted to a network (referred to as transmission data), and in a case that the transmission data is present, transmits it to the network via the wireless communication module 50 and the antenna 50a. Furthermore, the input-output processor 42a receives data transmitted from other game apparatuses (referred to as reception data) via the network, the antenna 50a and the wireless communication module 50, and stores the reception data in the flash memory 44. If the reception data does not satisfy a predetermined condition, the reception data is abandoned as it is. In addition, the input-output processor 42a receives data (download data) downloaded from the download server via the network, the antenna 50a and the wireless communication module 50, and stores the download data in the flash memory 44.

Furthermore, the input-output processor 42a receives input data transmitted from the controller 22 via the antenna 52a and the wireless controller module 52, and (temporarily) stores it in the buffer area of the internal main memory 42e or the external main memory 46. The input data is erased from the buffer area after being utilized in the processing by the CPU 40 (game processing, for example).

In this embodiment, as described above, the wireless controller module 52 performs a communication with the controller 22 in accordance with Bluetooth standards.

In addition, the input-output processor 42a is connected with the expansion connector 60 and the connector for external memory card 62. The expansion connector 60 is a connector for interfaces, such as USB, SCSI, etc., and can be connected with medium such as an external storage, and peripheral devices such as another controller different from the controller 22. Furthermore, the expansion connector 60 is connected with a cable LAN adaptor, allowing the cable LAN to be used in place of the wireless communication module 50. The connector for external memory card 62 can be connected with an external storage like a memory card. Thus, for example, the input-output processor 42a accesses the external storage via the expansion connector 60 and the connector for external memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 is set to a mode of a normal energized state in which the respective components of the game apparatus 12 are supplied with power through an AC adapter not shown (referred to as "normal mode"). On the other hand, when the power button 20a is turned off, the system LSI 42 is set to a mode in which only a part of the components of the game apparatus 12 is supplied with power, and the power consumption is reduced to minimum (hereinafter referred to as a "standby mode").

In this embodiment, in a case that the standby mode is set, the system LSI 42 issues an instruction to stop supplying the power to the components except for the input-output processor 42a, the flash memory 44, the external main memory 46, the ROM/RTC 48, the wireless communication module 50, and the wireless controller module 52. Accordingly, in this embodiment, in the standby mode, the CPU 40 never performs an application.

Although the system LSI 42 is supplied with power even in the standby mode, generation of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that utilizing the standby mode is not desired, by making the standby mode unusable, when the power button 20a is turned off, the power supply to all the circuit components are completely stopped.

Furthermore, switching between the normal mode and the standby mode can be performed by turning on and off the power switch 26h of the controller 22 by remote control. If the remote control is not performed, setting is made such that the power supply to the wireless controller module 52a is not performed in the standby mode.

The reset button 20b is also connected to the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

FIG. 3(A) to FIG. 3(E) show one example of an external appearance of the controller 22. FIG. 3(A) shows a leading end surface of the controller 22, FIG. 3(B) shows a top surface of the controller 22, FIG. 3(C) shows a right side surface of the controller 22, FIG. 3(D) shows a bottom surface of the controller 22, and FIG. 3(E) shows a trailing end surface of the controller 22.

Referring to FIG. 3(A) to FIG. 3(E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3(B), on the top surface of the housing 22a, there are provided a cross key 26a, a 1 button 26b, a 2 button 26c, an A button 26d, a – button 26e, a HOME button 26f, a + button 26g and a power switch 26h. Moreover, as shown in FIG. 3(C) and FIG. 3(D), an inclined surface is formed on a bottom surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or an object (player character or player object) operable by a player, instruct the moving direction of a cursor, or merely instruct the direction.

The 1 button 26b and the 2 button 26c are respectively push button switches. They are used for a game operation, such as adjusting a viewpoint position and a viewpoint direction in displaying the 3D game image, i.e. a position and an image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than a directional instruction, specifically arbitrary actions, such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, in a case that the controller 22 is used as a pointing device, the A-button switch 26d is used to instruct a decision of an icon or a button image designated by a pointer (designation image) on the game screen. For example, when the image of the player object and the button image or the icon are decided, an instruction or a command set in advance corresponding to the button image can be input, or the function set to the icon can be executed.

The − button 26e, the HOME button 26f, the + button 26g, and the power supply switch 26h are also push button switches. The − button 26e is used for selecting a game mode. The HOME button 26f is used for displaying a game menu (menu screen). The + button 26g is used for starting (resuming) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger, such as shooting, and designating a position selected by the controller 22. In a case that the B-trigger switch 26i is continued to be pushed, it is possible to make movements and parameters of the player object constant. In a fixed case, the B-trigger switch 26i functions in the same way as the normal B button, and is used for canceling the action and the command determined by the A-button 26d.

As shown in FIG. 3(E), an external expansion connector 22b is provided on a trailing end surface of the housing 22a, and as shown in FIG. 3(B), an indicator 22c is provided on the top surface and on the side of the trailing end of the housing 22a. The external expansion connector 22b is utilized for connecting another expansion controller (not shown) other than the controller 22. The indicator 22c is made up of four LEDs, for example. The indicator 22c can light any one of the four LEDs and show identification information (controller number) of the controller 22 according to the lighted LED. Furthermore, the indicator 22c can show the remaining amount of the battery of the controller 22 depending on the number of LEDs to be emitted.

In addition, the controller 22 has an imaged information arithmetic section 80 (see FIG. 4), and as shown in FIG. 3(A), a light incident opening 22d of the imaged information arithmetic section 80 is provided on the leading end surface of the housing 22a. Furthermore, the controller 22 has a speaker 86 (see FIG. 4), and the speaker 86 is provided inside the housing 22a at the position corresponding to a sound release hole 22e between the 1 button 26b and the HOME button 26f on the top surface of the housing 22a as shown in FIG. 3(B).

Note that the shape of the controller 22 and the shape, number and setting position of each input means 26 shown in FIG. 3(A) to FIG. 3(E) are simply examples, and needless to say, even if they are suitably modified, the present invention can be implemented.

Figure 4:
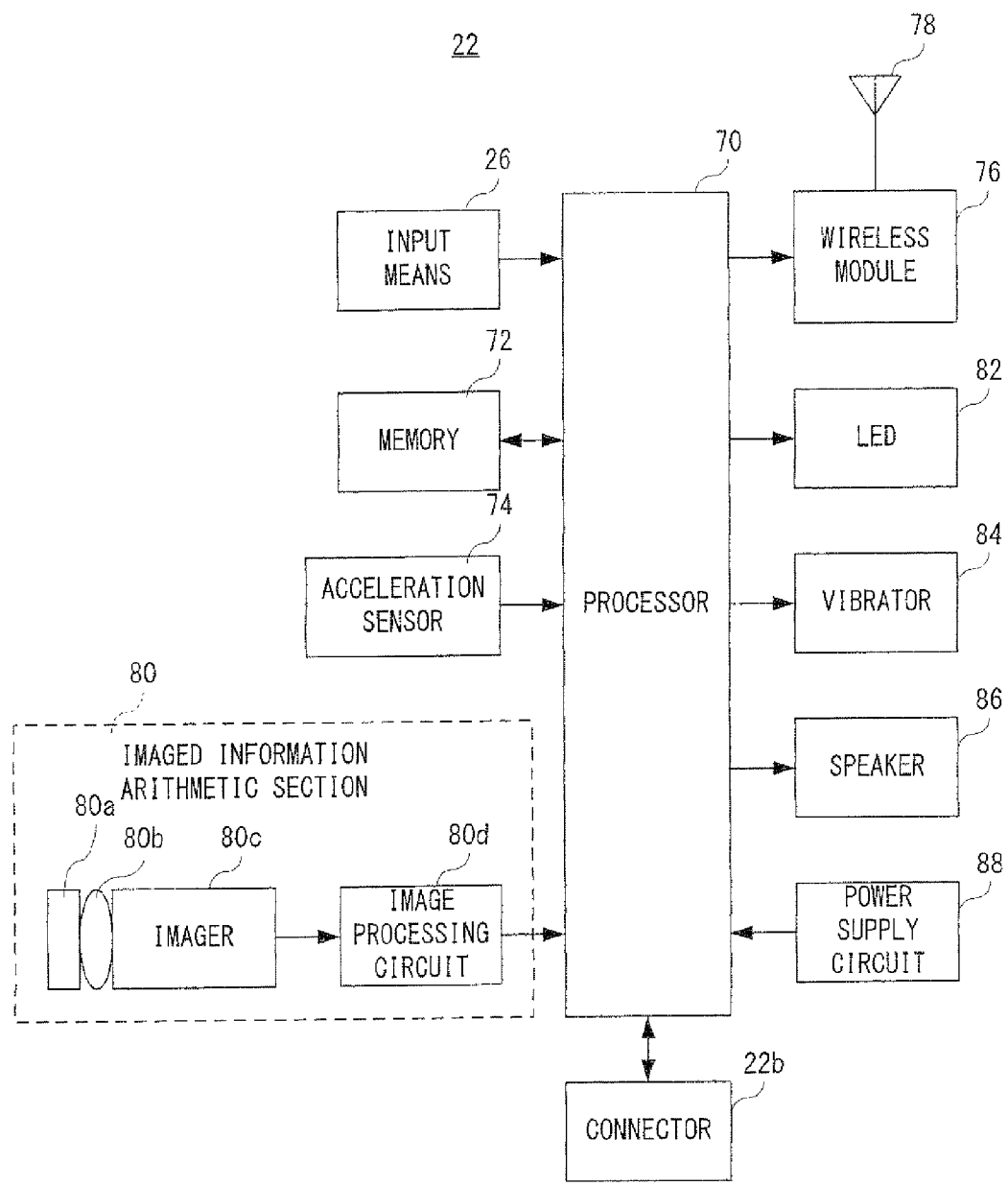
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a wireless module 76, the imaged information arithmetic section 80, an LED 82 (the indicator 22c), a vibrator 84, a speaker 86, and a power supply circuit 88 by an internal bus (not shown). Moreover, an antenna 78 is connected to the wireless module 76.

For simplicity, although omitted in FIG. 4, the indicator 22c is made up of the four LEDs 82 as described above.

The processor 70 is in charge of an overall control of the controller 22, and transmits (inputs) information (input information) input by the input means 26, the acceleration sensor 74, and the imaged information arithmetic section 80 as input data to the game apparatus 12 via the wireless module 76 and the antenna 78. At this time, the processor 70 uses the memory 72 as a working area or a buffer area. An operation signal (operation data) from the aforementioned input means 26 (26a to 26i) is input to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. The same thing can be the hereafter.) The processor 70 detects the acceleration data given from the acceleration sensor 74 for each second predetermined time, and stores it in the memory 72 once.

The processor 70 creates input data including at least one of the operation data, the acceleration data and marker coordinate data as described later, and transmits the input data thus created to the game apparatus 12 for each third predetermined time (5 msec, for example).

Figure 3:
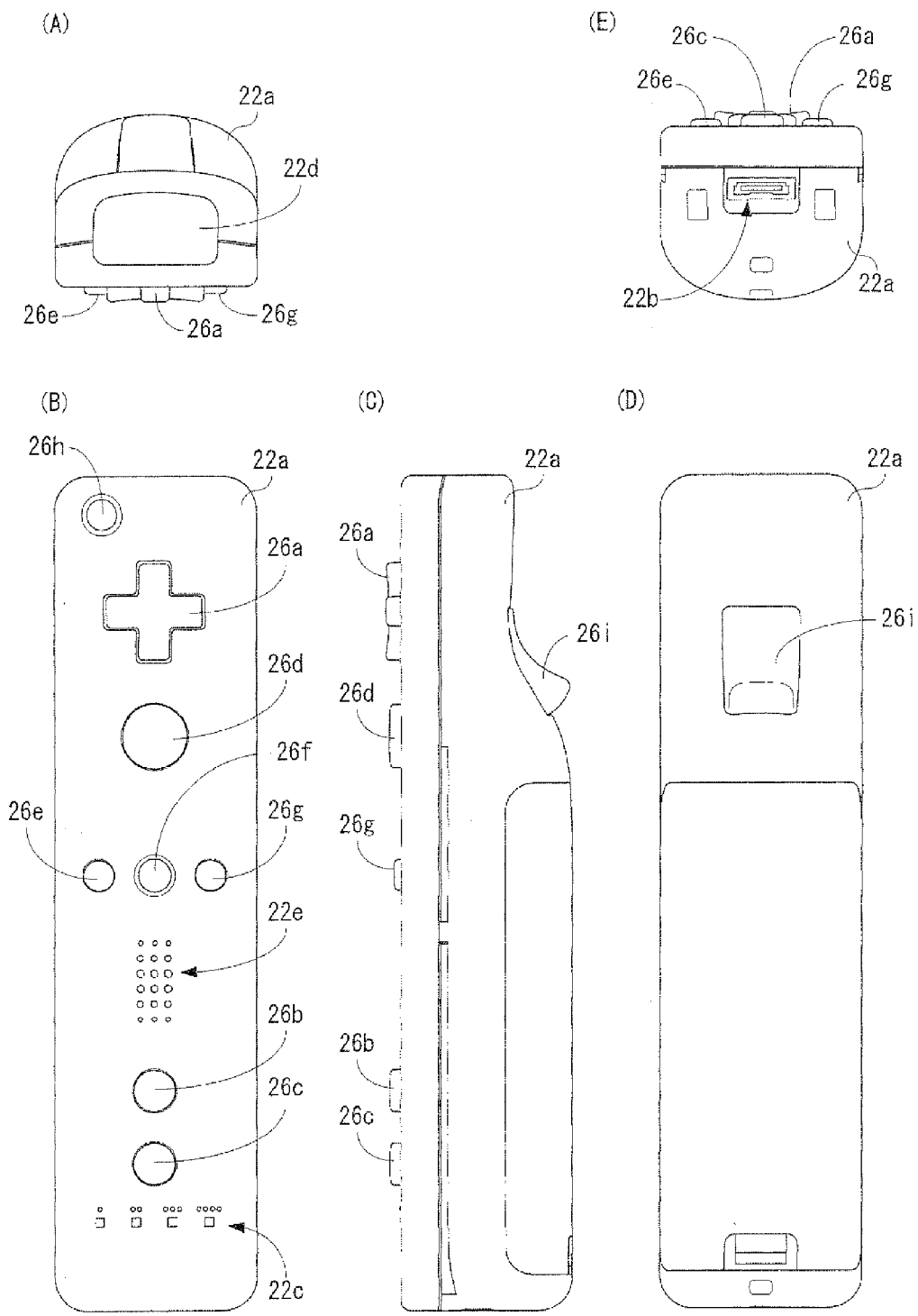
FIG. 3 is an illustrative view showing an appearance of a controller shown in FIG. 1.

In this embodiment, although omitted in FIG. 3 (A) to FIG. 3 (E), the acceleration sensor 74 is provided inside the housing 22a on the circuit board in the vicinity of where the cross key 26a is arranged.

The wireless module 76 modulates a carrier of a predetermined frequency by the input data, by using a technique of Bluetooth, for example, and emits its weak radio wave signal from the antenna 78. Namely, the input data is modulated to the weak radio wave signal by the wireless module 76 and transmitted from the antenna 78 (controller 22). The weak radio wave signal thus transmitted is received by the wireless controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs processing of the application (game processing), following the acquired input data and the application program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights ahead of the monitor 34. Accordingly, by providing the infrared rays filter 80a, it is possible to image the image of the markers 340m and 340n more accurately. The lens 80b condenses the infrared rays passing thorough the infrared rays filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data (marker coordinate data to be described later) for each fourth predetermined time. It should be noted that a description of the process in the image processing circuit 80d is made later.

Figure 5:
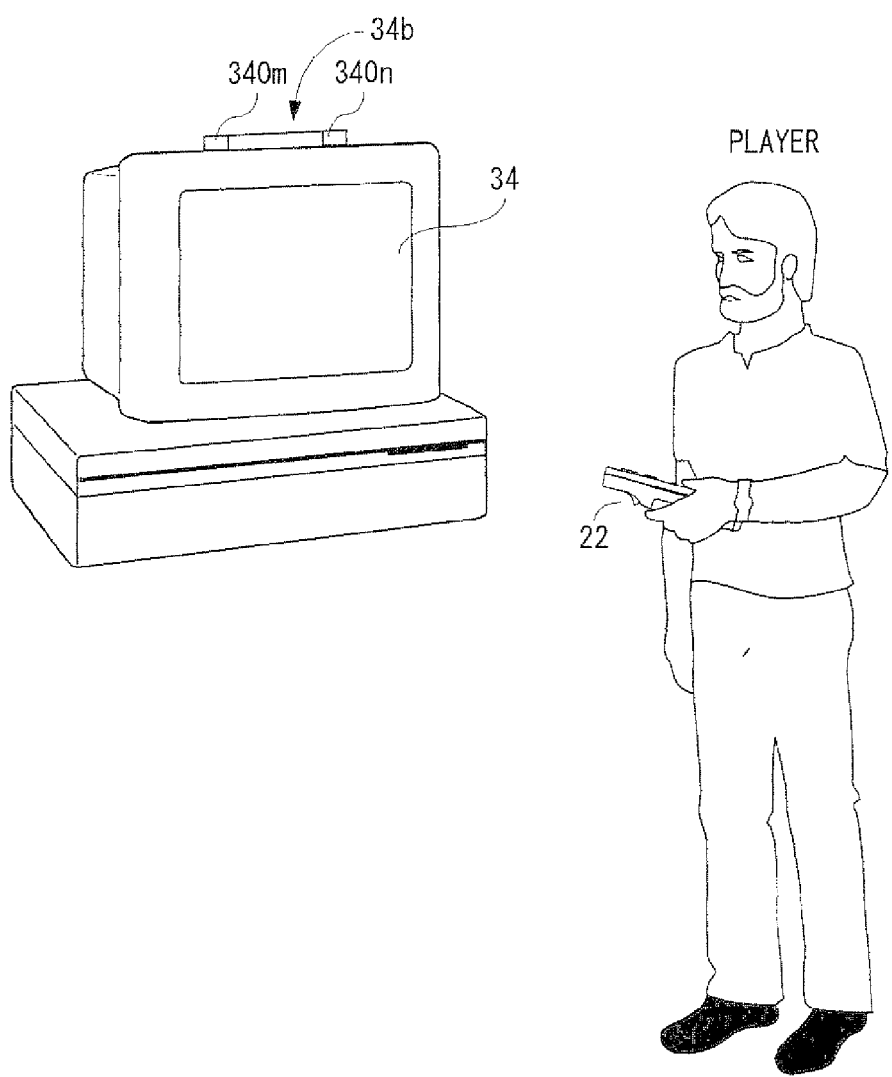
FIG. 5 is an illustrative view roughly explaining a situation when a game is played by means of the controller shown in FIG. 1.

FIG. 5 is an illustrative view summarizing a state when a player plays a game by utilizing the controller 22. It should be noted that the same is true for a case that another application is executed as well as a game playing. As shown in FIG. 5, when playing the game by means of the controller 22 in the video game system 10, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen designated by the controller 22, and changing a distance between the controller 22 and each of the markers 340m and 340n.

Figure 6:
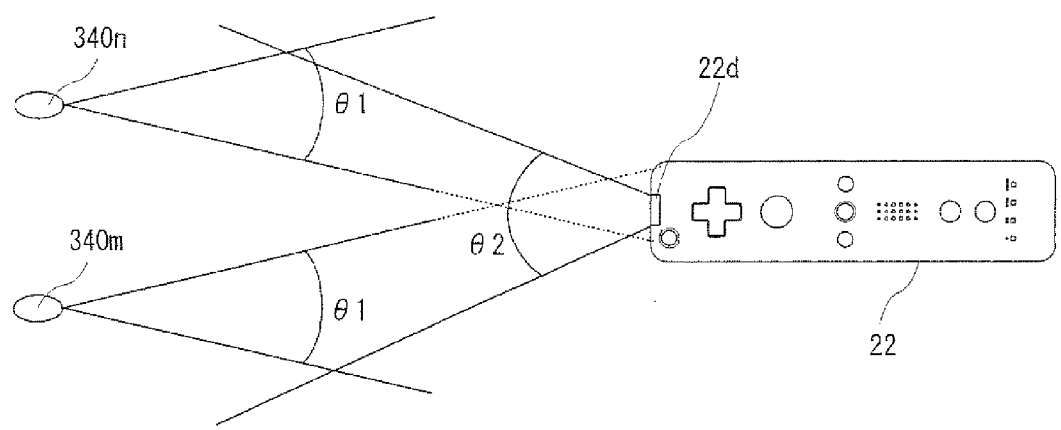
FIG. 6 is an illustrative view explaining markers and viewing angles of the controller shown in FIG. 1.

FIG. 6 is a view showing viewing angles between the respective markers 340m and 340n, and the controller 22. As shown in FIG. 6, each of the markers 340m and 340n emits infrared ray within a range of a viewing angle θ1. Also, the imager 80c of the imaged information arithmetic section 80 can receive incident light within the range of the viewing angle θ2 taking the line of sight of the controller 22 as a center. For example, the viewing angle θ1 of each of the markers 340m and 340n is 34° (half-value angle) while the viewing angle θ2 of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle θ2 of the imager 80c, and the controller 22 exists in at least one of the viewing angles θ1 of the marker 340m or 340n. In this state, the controller 22 can detect at least one of the markers 340m and 340n. The player can perform a game operation by changing the position and the attitude of the controller 22 in the range satisfying the state.

If the position and the attitude of the controller 22 are out of the range, the game operation based on the position and the attitude of the controller 22 cannot be performed. Hereafter, the above-described range is called an "operable range".

Figure 7:
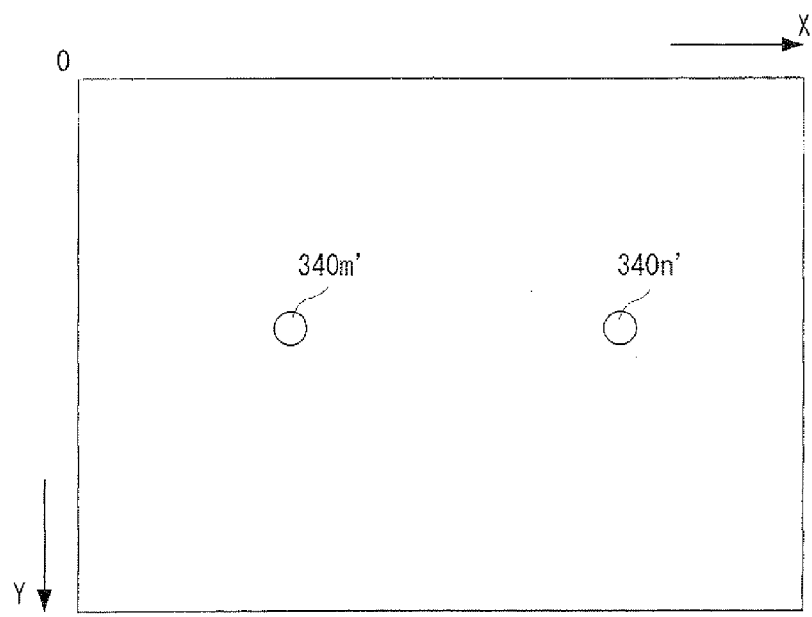
FIG. 7 is an illustrative view showing one example of an imaged image including object images.

If the controller 22 is held within the operable range, an image of each of the markers 340m and 340n is imaged by the imaged information arithmetic section 80. That is, the imaged image obtained by the imager 80c includes an image (object image) of each of the markers 340m and 340n as an object to be imaged. FIG. 7 is an illustrative view showing one example of the imaged image including the object images. The image processing circuit 80d calculates coordinates (marker coordinates) indicative of the position of each of the markers 340m and 340n in the imaged image by utilizing the image data of the imaged image including the object images.

Since the object image appears as a high-intensity part in the image data of the imaged image, the image processing circuit 80d first detects the high-intensity part as a candidate of the object image. Next, the image processing circuit 80d determines whether or not the high-intensity part is the object image on the basis of the size of the detected high-intensity part. The imaged image may include images other than the object image due to sunlight through a window and light of a fluorescent lamp in the room as well as the images 340m' and 340n' corresponding to the two markers 340m and 340n as an object image. The determination processing whether or not the high-intensity part is an object image is executed for discriminating the images 340m' and 340n' as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80d calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80c. Now, the resolution of the imaged image imaged by the imager 80c shall be 126×96, and the barycenter position shall be calculated with the scale of 2024×768. That is, the marker coordinate is represented by the integer from (0, 0) to (2024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as object images by the determination process, and therefore, two marker coordinates are calculated. The image processing circuit 80d outputs data indicative of the calculated two marker coordinates. The data of the output marker coordinates (marker coordinate data) is included in the input data by the processor 70 as described above, and transmitted to the game apparatus 12.

The game apparatus 12 (CPU 40) detects the marker coordinate data from the received input data to thereby calculate an designated position (designated coordinate) by the controller 22 on the screen of the monitor 34 and a distances from the controller 22 to each of the markers 340m and 340n on the basis of the marker coordinate data. More specifically, from the position of the mid point of the two marker coordinates, a position to which the controller 22 faces, that is, a designated position is calculated. The distance between the object images in the imaged image is changed depending on the distance between the controller 22 and each of the markers 340*m* and 340*n*, and therefore, the game apparatus 12 can grasp the distance between the controller 22 and each of the markers 340*m* and 340*n* by calculating the distance between the two marker coordinates.

Figure 8:
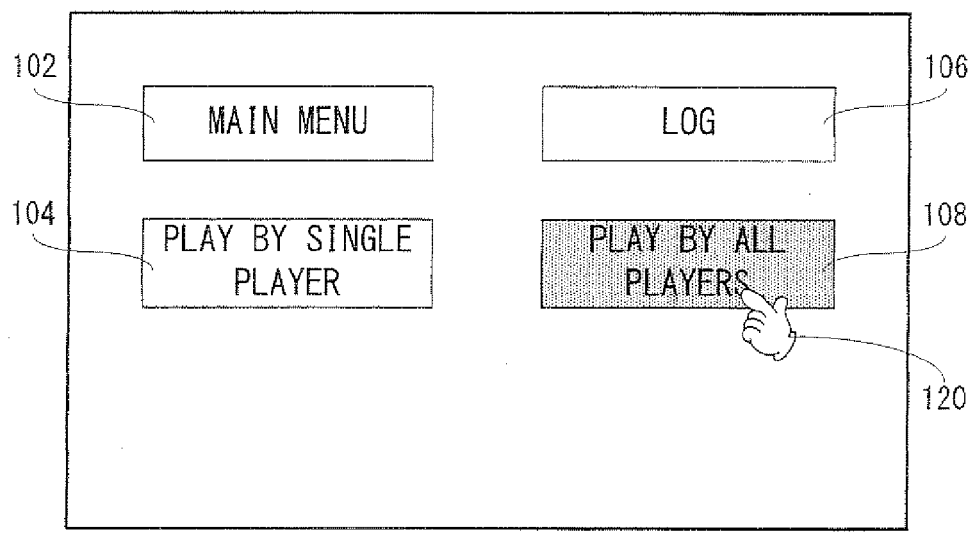
FIG. 8 is an illustrative view showing one example of a menu screen and a player selection screen to be displayed on a monitor shown in FIG. 1.
Figure 8:
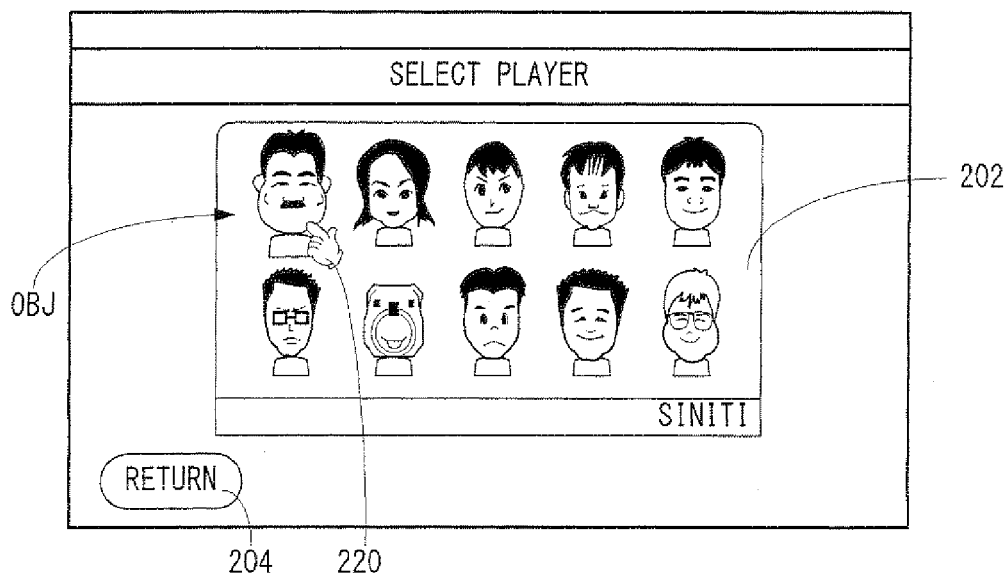

In the game system 10 with such a configuration, a main game capable of playing one mini game selected out of a plurality of mini games can be executed. For example, when the main game is started, a menu screen 100 shown in FIG. 8(A) is displayed on the monitor 34. On the menu screen 100, four button images 102, 104, 106, 108 are displayed. The button image 102 is a GUI (Graphical User Interface) to return to a main menu for selecting game software and application software which are displayed at a time when the game apparatus 12 is started. The button image 104 is a GUI to play a game by a single player. The button image 106 is, although a detailed explanation is omitted, a GUI to refer to a log (history for game playing). The button image 108 is a GUI to allow two or more players to play the game in turn. Here, as described later, even if the two or more players play a game in turn, one player can continuously play the game. Furthermore, on the menu screen 100, a designation image 120 is displayed. The designation image 120 is an image to represent a position on the screen designated by the pointing device (controller 22 in this embodiment) similar to the mouse pointer. This holds true for the designation image (220, 320, 420, 520, 620) on other screens below. In FIG. 8(A), the designation image 120 designates the button image 108. In order to represent the designated state, the button image 108 is blacked out. However, this is merely one example, and the brightness of the designated button image (102, 104, 106, 108) may be made high, and the button image (102, 104, 106, 108) which is not designated may be grayed out. Alternatively, the color of only the designated button image (102, 104,106,108) may be reversed, Although illustration is omitted, this holds true for a case that the button image on another screen (200, 300, 400, 500, 600) and an image of the player object are designated by the designation image (220, 320, 420, 520, 620).

For example, when the decision button (A button 26*d* in this embodiment) is pressed with the designation image 120 put on the button image (102, 104, 106, 108), the button image (102, 104, 106, 108) can be turned on (selected). This holds true for a case that the button image is turned on, and the image of the player object is selected.

As described above, when the button image 104 is turned on (clicked) on the menu screen 100, playing by a single player is selected. If the playing by a single player is selected, a player selection screen 200 shown in FIG. 8(B) is displayed on the monitor 34. The player selection screen 200 is a screen to select a player who participates in the game.

As shown in FIG. 8(B), at the center of the player selection screen 200, a display region 202 is provided. Furthermore, at the lower left of the player selection screen 200, a button image 204 is displayed. In addition, on the player selection screen 200, a designation image 220 is displayed.

The display region 202 is a region to display images of a plurality of selectable player objects OBJ. Here, the selectable player object OBJ means a player (hereinafter referred to as "not-yet-selected player") which has not yet been selected to participate in the game. Although illustration is omitted, when the display region 202 is scrolled, or a page is turned, images of other player objects OBJ are displayed. When any one of the player objects OBJ is selected, the selected player object OBJ is selected as a player who is to participate in the game. The button image 204 is a GUI to return to the screen directly before. Here, the screen is returned to the above-described menu screen 100.

Figure 9:
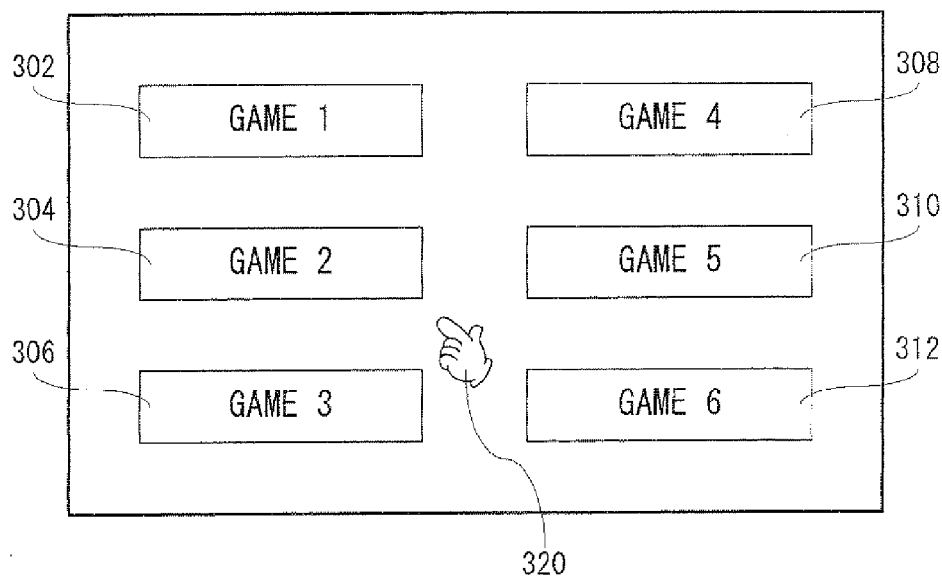
FIG. 9 is an illustrative view showing one example of a game selection screen and a pause screen to be displayed on the monitor shown in FIG. 1.
Figure 9:
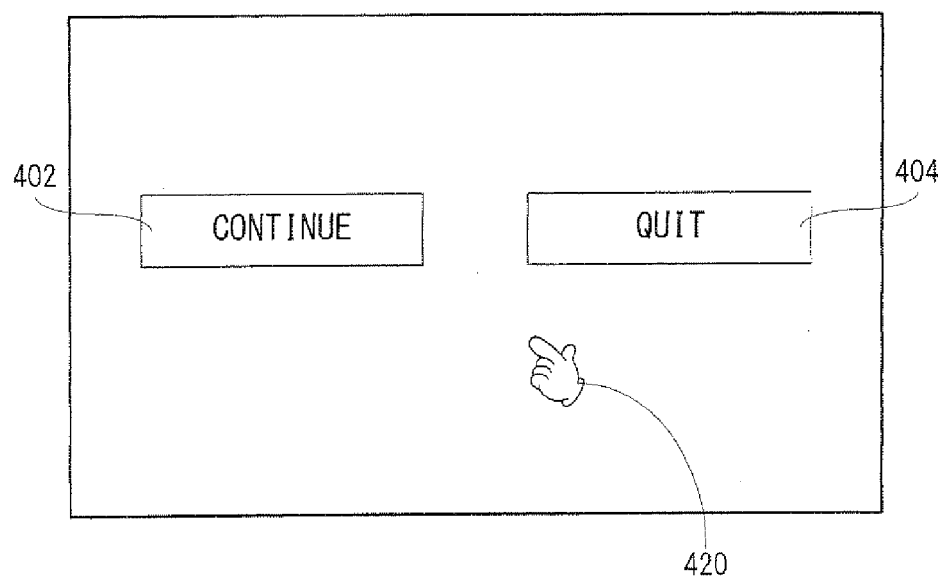

When the image of one player object OBJ is selected on the player selection screen 200 in FIG. 8(B), that is, when the player is selected, a game selection screen 300 shown in FIG. 9(A) is displayed on the monitor 34. As shown in FIG. 9(A), on the game selection screen 300, six button images 302, 304, 306, 308, 310, 312 are displayed. Furthermore, on the game selection screen 300, a designation image 320 is displayed. When on the game selection screen 300, any one of the button images 302-312 is turned on according to an operation by the player, a corresponding mini game (game 1, 2, 3, 4, 5, 6) is selected, and the selected game (1-6) is executed (started). That is, the player can play the desired game (1-6).

Although a detailed explanation is omitted, the number of games needs not to be restricted to six.

During the game, the player makes an instruction for pause (turn on the + button 26*g*) to thereby pause the game. At this time, a pause screen 400 shown in FIG. 9(B) is displayed on the monitor 34. On the pause screen 400, two button images 402, 404 are displayed. Furthermore, on the pause screen 400, a designation image 420 is displayed. The button image 402 is a GUI to restart the game (1-6). Furthermore, the button image 404 is a GUI to quit (quit in progress) the game (1-6). In a case of playing by a single player, when the button image 404 is turned on, the paused game (1-6) is quitted in progress to display the game selection screen 300 shown in FIG. 9(A) on the monitor 34. Accordingly, selecting another game (1-6) is performed.

Here, in a case that the + button 26*g* is turned on with the game (1-6) paused as well, the game (1-6) is restarted.

Figure 10:
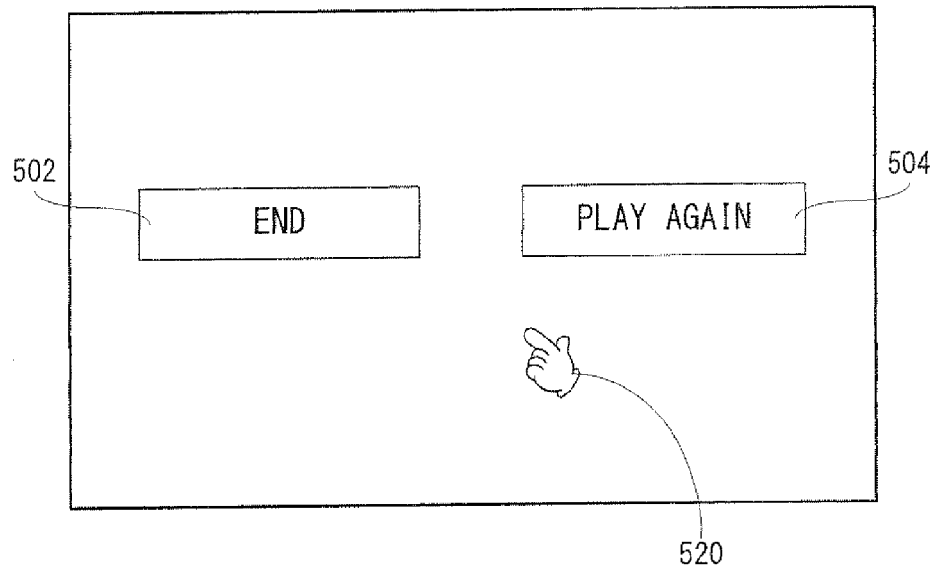
FIG. 10 is an illustrative view showing one example of a game change selection screen and a next-game-player selection screen to be displayed on the monitor shown in FIG. 1.
Figure 10:
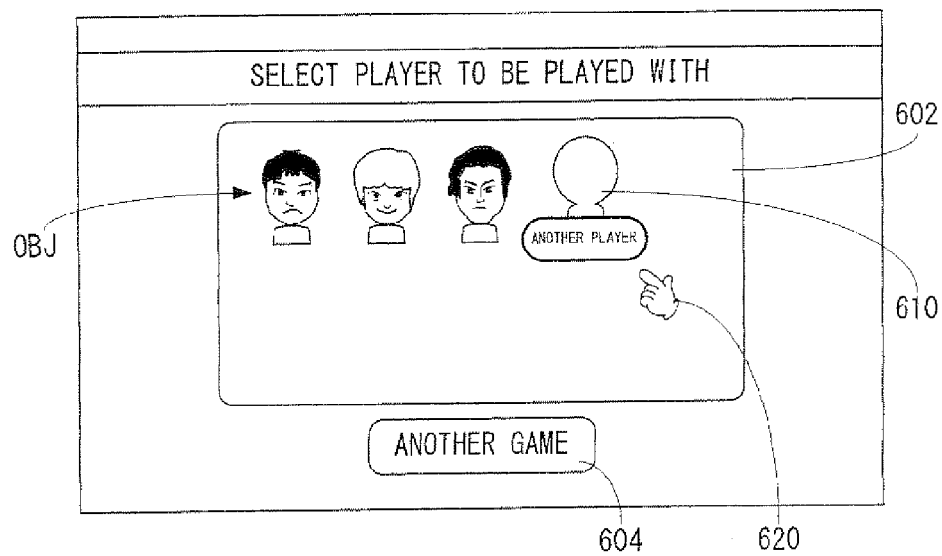

Furthermore, in a case of playing by a single player, when the game is cleared or the game is to be over, that is, when the game (1-6) is ended, a game change selection screen 500 shown in FIG. 10(A) is displayed on the monitor 34. On the game change selection screen 500, two button images 502, 504 are displayed. In addition, on the game change selection screen 500, a designation image 520 is displayed. The button image 502 is a GUI to select another game (1-6). Here, the button image 502 is turned on to display the game selection screen 300 on the monitor 34, which allows the game (1-6) the same as the game (1-6) played directly before to be selected. The button image 504 is a GUI to play the game (1-6) played directly before again.

Returning to FIG. 8(A), when the button 108 is turned on, playing by two or more players is selected. In a case that the playing by two or more players is selected as well, the player selection screen 200 shown in FIG. 8(B) is displayed to allow a player to be selected. Here, in a case that the playing by two or more players is selected, a changed with another player may occur, and the player is registered as a player which is selected as participating in the game (1-6) (hereinafter, referred to as "already-selected player"). Registering the already-selected player is explained in detail below.

Furthermore, when the player is selected, the game selection screen 300 shown in FIG. 9(A) is displayed. Accordingly, the player selects the desired game (1-6) as described above, and executes (starts) the selected game (1-6).

When there is an instruction for pause during the game, the game (1-6) is paused, and the pause screen 400 shown in FIG. 9(B) is displayed on the monitor 34. When the button image 402 is turned on on the pause screen 400, similar to playing by a single player, the paused game (1-6) is restarted. Here, in a case of playing by two or more players, and the button image 404 is turned on to end the paused game (1-6), a next-game-player selection screen 600 shown in FIG. 10(B) is displayed on the monitor 34. Moreover, when the game is cleared or the game is to be ended to end the game (1-6), the next-game-player selection screen 600 shown in FIG. 10(B) is similarly displayed on the monitor 34.

The next-game-player selection screen 600 is a screen to select a player for a next game (change player) and to select another game. As shown in FIG. 10(B), on the next-game-player selection screen 600, a display region 602 is provided at the center of the screen. Furthermore, below the display region 602, a button image 604 is displayed. In addition, on the next-game-player selection screen 600, a designation image 620 is displayed.

On the display region 602, images of player objects OBJ corresponding to the already-selected players are displayed and an image (hereinafter referred to as "not-yet-selected player selection image") 610 to select a player object OBJ of the not-yet-selected player which has not yet been selected to participate in the game (1-6) is displayed. When the image of the player object OBJ (already-selected player) displayed in the display region 602 is selected, the game (1-6) as to the corresponding player object OBJ is executed. Thus, when the player object OBJ except for the player who plays the game directly before is selected, the player is changed. Here, when the player object OBJ of the player who plays the game directly before is selected, the player is not changed.

The button image 604 is a GUI to select another game without changing with another player. When the button image 604 is selected, the game selection screen 300 shown in FIG. 9(A) is displayed in order to select another game (1-6). Thus, the game (1-6) selected on the game selection screen 300 as to the same player is started. Consequently, the same player can continuously play the game (1-6) as well as two or more players take turns to play the game (1-6). Furthermore, when a player is registered as an already-selected player, it is possible to selectively play the game (1-6), so that there is no need of registering the already-selected player for each game (1-6). That is, the registered already-selected player is common to the respective games (1-6).

In addition, the not-yet-selected player selection image 610 is a GUI to select the not-yet-selected player as a player for a next game and register (add) it as an already-selected player. Accordingly, when the not-yet-selected player selection image 610 is selected (turned on), the player selection screen 200 shown in FIG. 8(B) is displayed on the monitor 34. When the player (player object OBJ) is selected on the player selection screen 200 in a manner as described above, the selected player (not-yet-selected player) is decided as a player for the next game, and the not-yet-selected player is registered as an already-selected player. Thus, by selecting the image of the player object OBJ displayed on the player selection screen 200, processing of registering the corresponding not-yet-selected player as an already-selected player is executed, and therefore, the image of the player object OBJ may be called an "icon".

Here, in this embodiment, in a case of playing the game by two or more players, up to 9 players (player object OBJ) can be registered as already-selected players. Accordingly, when the not-yet-selected player is registered as an already-selected player, if the maximum number of players has already been registered, the registered already-selected player (player object OBJ) is erased according to a predetermined rule. In this embodiment, the already-selected player having the oldest time of the previous game playing is set to be erased as a predetermined rule. Here, the predetermined rule should not be restricted thereto. In another embodiment, as a predetermined rule, the already-selected player having the most-playing number (the least-playing number) may be set to be erased, or the already-selected player having the oldest time of the registration may be set to be erased.

Figure 11:
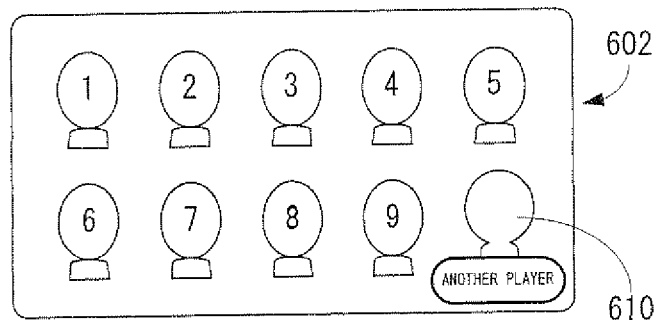
FIG. 11 is an illustrative view showing a relation between a display order and a display position within a display region on the next-game-player selection screen.

FIG. 11 shows a relation between the display order and the display position of the already-selected players in the display region 602 on the next-game-player selection screen 600. For example, the display order is indicated by integers from one to nine, and as shown in FIG. 11, the player object OBJ is displayed to be arranged according to the display order from the upper left. Then, following the image of the player object OBJ being the lowest display order, a not-yet-selected player selection image 610 is displayed. Accordingly, as can be understood from FIG. 11, in a case that nine players (player objects OBJ) are registered, the images of the nine player objects are displayed according to a display order, and the not-yet-selected player selection image 610 is displayed next to the image of the player object OBJ having a display order of "9".

As described above, in this embodiment, in a case that the number of already-selected players reaches the maximum number, when the not-yet-selected player is registered as an already-selected player, the registered already-selected player is adapted to be erased according to the predetermined rule. Accordingly, the display order as to the display region 602 is updated every time that the game is ended. That is, sorting is performed such that the display order of the player (player object OBJ) who played the game directly before is "1". In this embodiment, the order the time when the previous playing is made, the lower in rank the display order of the already-selected player (player object OBJ) is. That is, the images of the already-selected players (player objects OBJ) are arranged in the display region 602 in early order at time by which a previous game is played. Thus, the already-selected player erased according to the above-described predetermined rule is the player object OBJ having the display order of "9".

In this embodiment, on condition that the player object OBJ having the oldest time of the previously game playing is erased is set as the predetermined rule, the sorting is performed such that the display order of the player object OBJ of the player who plays the game directly before becomes "1", but there is no need of being restricted thereto.

For example, in a case that the already-selected player having the most-playing number (the least-playing number) is erased is set as a predetermined rule, when the game is ended, the number of playing as to the player object OBJ which plays the game directly before is updated (added by one), and the display order is sorted depending on the number of plays of each of all the already-selected players.

Additionally, in a case that the already-selected player having the oldest registration time is erased is set as a predetermined rule, there is no need of sorting the display order for each playing, and each time that a new already-selected player is registered, the display order of each of the registered already-selected players is added by one.

Thus, according to the predetermined rule for erasing the already-selected player, a deciding method (rule) of the display order of the already-selected players can also be set. Furthermore, the already-selected players are displayed to be arranged in the display region 602 according to the display order depending on the time of the previous game playing, the number of playing times, or the time when the registration is made, so that it is possible to relatively easily select the next player, that is, the player to be changed. This is because in a case that the game is played by a plurality of players, the display order of the already-selected players is taken as an index when a player to be played next is selected (decided). For example, the player having a low display order, such as the player who has not played for a long time, the player having the least-playing number can be preferentially selected as a next player. Furthermore, for example, the player having a high display order, such as the player who has recently been registered, can be preferentially selected as a next player. This is because that the player is considered to be less in the number of playing times and shorter in playing time than the player which has been registered in first.

Figure 12:
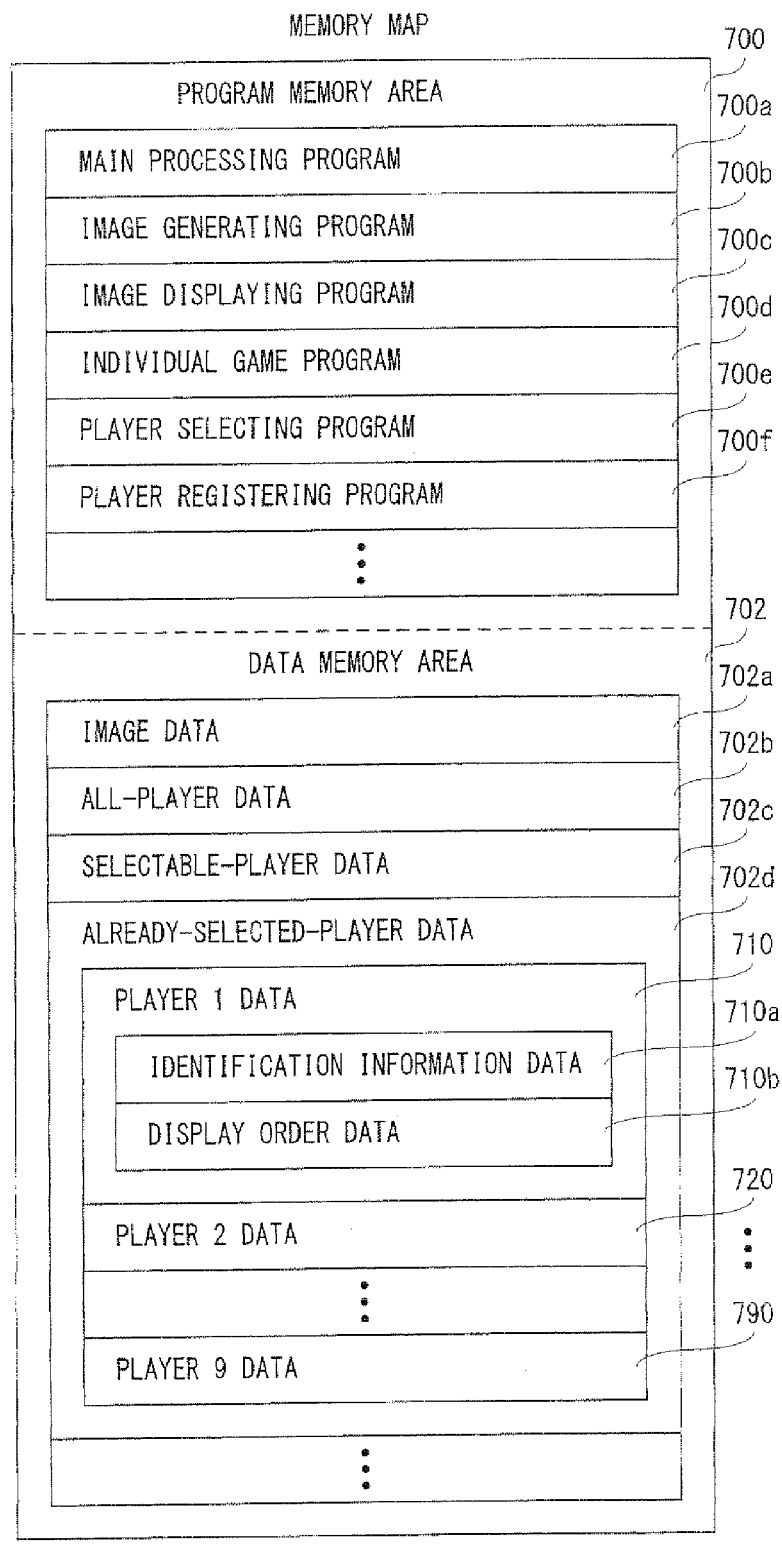
FIG. 12 is an illustrative view showing a memory map of a main memory shown in FIG. 2.

FIG. 12 shows an illustrative view showing one example of a memory map of the main memory (42e, 46) shown in FIG. 2. As shown in FIG. 12, the main memory (42e, 46) includes a program memory area 700 and a data memory area 702. The program memory area 700 stores a game program, and the game program is constructed of a main processing program 700a, an image generating program 700b, an image displaying program 700c, an individual game program 700d, a player selecting program 700e, a player registering program 700f, etc.

The main processing program 700a is a program for processing a main routine as to the virtual game (main game) of this embodiment. The image generating program 700b is a program to generate game image data by utilizing image data 702a described later. The image displaying program 700c is a program to display a game screen (100-600, etc.) corresponding to the game image data generated according to the image generating program 700b on the monitor 34.

The individual game program 700d is a program to execute game processing as to each of the plurality of mini games (games 1-6). Although illustration is omitted, the individual game program 700d includes a plurality of programs corresponding to the respective games (1-6). The player selecting program 700e is a program to select the player who is to participate in the game. In this embodiment, the player selection screen 200 is displayed to allow selection of a player (player object OBJ). The player registering program 700f is a program to register the player selected according to the player selecting program 700e as an already-selected player. In this embodiment, in a case of playing the game by two or more players, the player who is selected first and the not-yet-selected player who is selected at the end of the game are registered (added) as already-selected players.

Although illustration is omitted, the game program includes a sound output program, a backup program, etc. The sound output program is a program to output sound necessary for the game, such as a sound effect, BGM, a voice or an onomatopoeic sound of the player object OBJ. The backup program is a program to stored (save) the game data (proceeding data, result data) stored in the main memory (42e, 46) in the memory card and the flash memory 44.

The data memory area 702 stores image data 702a, all-player data 70b, selectable-player data 702c, and already-selected-player data 702d. The image data 702a is data, such as polygon data and texture data, to generate game image data. The all-player data 70b is data (data of an image, a profile, a game level, log, etc.) of all the player objects OBJ registered in the game apparatus 12 itself. For example, the all-player data 702b is saved in the flash memory 44, and loaded from the flash memory 44 at the beginning of the game.

The selectable-player data 702c is data describing information about whether or not registration is possible in correspondence with each player object OBJ. For example, the selectable-player data 702c is constructed of a register having the number of bits corresponding to the number of all the player objects OBJ registered in the game apparatus 12 itself, and if the player object OBJ is selectable, a data value "0" is set to the corresponding bit, and if the player object OBJ is unselectable, a data value "1" is set to the corresponding bit. Here, the player object OBJ of the already-selected player is unselectable, and the rest of the player object OBJ of the not-yet-selected player is selectable. Accordingly, in the register constructing of the selectable-player data 702c, the player object OBJ corresponding to the bit where a data value "0" is set is selectable, and the image of the player object OBJ is displayed on the display region 202 of the player selection screen 200.

The already-selected-player data 702d is data as to a player (player object OBJ) registered as an already-selected player, and includes player 1 data 710, player 2 data 720, . . . , player 9 data 790. In this embodiment, until the number of the players reaches the maximum number, this data is stored from the player 1 data 710, the player 2 data 720, . . . , the player 9 data 790 in this order. The player 1 data 710 includes identification information data 710a and display order data 710b. The identification information data 710a is data as to identification information (ID and name) for identifying the player object OBJ. The display order data 710 is numerical value data for indicating a display order in the display region 602 on the next-game-player selection screen 600. Accordingly, the image of the player object OBJ of the already-selected player is displayed at a display position corresponding to the display order indicated by the display order data 710 in the display region 602.

Although illustration is omitted, the manner the same as the player 1 data 710 can be applied to the player 2 data 720, . . . , the player 9 data 790. In addition, in a case that the player has not been registered, NULL data is stored in the information data and the display order data of the player n data 7n0. Here, n=1, 2, 3, . . . , 9.

Although illustration is omitted, the data memory area 702 stores other data, such as sound data, and is also provided with a flag and a counter (timer) necessary for execution of the game program.

Figure 13:
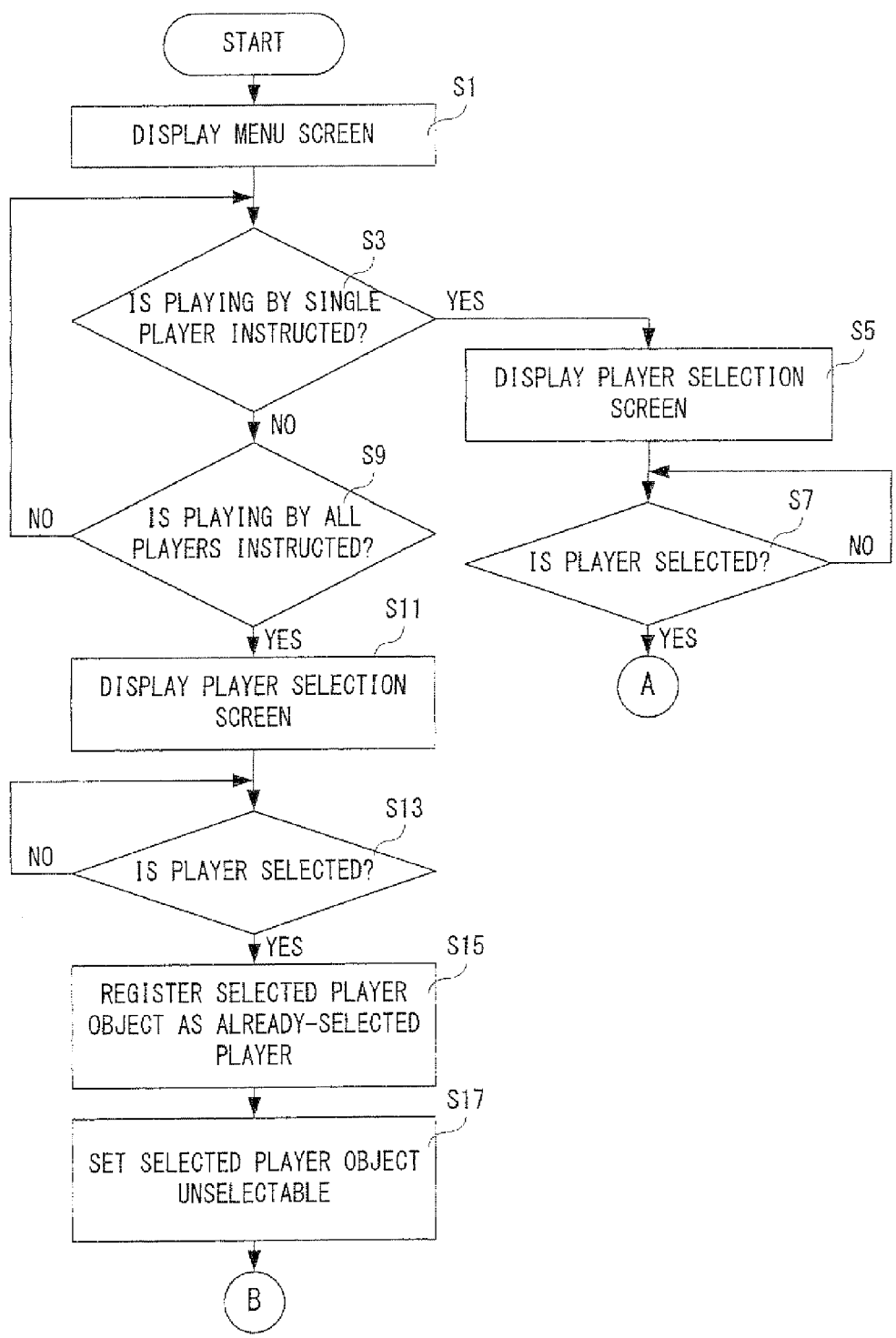
FIG. 13 is a flowchart showing a part of the entire processing of the CPU shown in FIG. 2.
Figure 18:
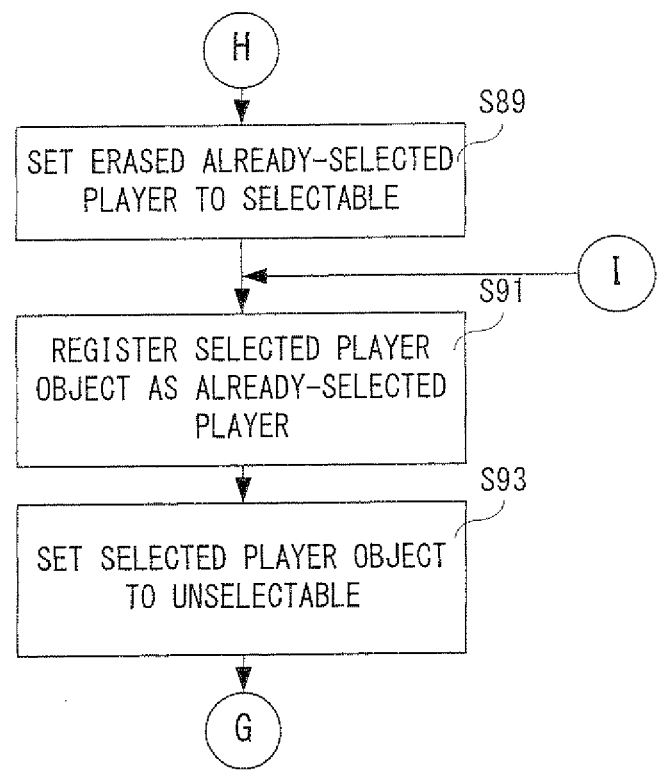
FIG. 18 a flowchart showing a sixth part of the entire process of the CPU shown in FIG. 2 and sequel to FIG. 17.

FIG. 13 or FIG. 18 is a flowchart showing the entire process of the CPU 40 shown in FIG. 2. As shown in FIG. 13, when starting the entire process, the CPU 40 displays the menu screen 100 shown in FIG. 8(A) on the monitor 34 in a step S1. In a next step S3, it is determined whether or not the playing by a single player is instructed. That is, the CPU 40 determines whether or not the button image 104 is turned on the menu screen 100. If "YES" in the step S3, that is, if the button image 104 is turned on, it is determined that the playing by a single player is instructed, and in a step S5, the player selection screen 200 shown in FIG. 8(B) is displayed on the monitor 34. At this time, the CPU 40 displays only the image of the selectable player object OBJ on the display region 202 with reference to the selectable-player data 702c. Here, at the beginning of the entire process, neither player object OBJ is registered as an already-selected player, and therefore, in the step S5, the images of all the player objects OBJ registered in the game apparatus 12 itself are displayed.

Although illustration is omitted, as described above, at the beginning of the entire process, the all-player data 702b is loaded from the flash memory 44 to the data memory area 702 of the main memory (42e, 46).

Succeedingly, in a step S7, it is determined whether or not the player (player object OBJ) is selected. That is, the CPU 40 determines whether or not the image of any one of the player objects OBJ is selected on the player selection screen 200. If "NO" in the step S7, that is, if the player is not selected, the process returns to the step S7 as it is. On the other hand, if "YES" in the step S7, that is, if the player is selected, the process proceeds to a step S19 shown in FIG. 14.

Although illustration is omitted, the button image 204 is displayed on the player selection screen 200, and if this is selected, the screen returns to the menu screen 100. This holds true hereafter.

Alternatively, if "NO" in the step S3, that is, if the button image 104 is not turned on, it is determined that the playing by a single player is not instructed, and in a step S9, it is determined whether or not playing by all the players is instructed. That is, the CPU 40 determines whether or not the button image 108 is turned on on the menu screen 100. If "NO" in the step S9, that is, if the button image 108 is not turned on, it is determined that the playing by all the players is not instructed, and the process returns to the step S3 as it is.

It should be noted that on the menu screen 100, the button image 102 and the button image 106 are provided, but these are omitted for simplicity. As described above, when the button image 102 is turned on, the entire process is ended to display the screen of the main menu on the monitor 34. Furthermore, when the button image 106 is turned on, the log is displayed on the monitor 34.

On the other hand, if "YES" in the step S9, that is, if the button image 108 is turned on, it is determined that the playing by all the players is instructed, and the player selection screen 200 shown in FIG. 8(B) is displayed on the monitor 34 in a step S11. Then, in a step S13, it is determined whether or not the player is selected. The processing in the steps S11 and S13 is the same as the processing in the above-described steps S5 and S7, and therefore, the duplicated explanation is omitted.

If "NO" in the step S13, the process returns to the same step S13. On the other hand, if "YES" in the step S13, the selected player object OBJ is registered as an already-selected player in a step S15. Here, the CPU 40 registers the identification information data 710$a$ and the display order data 710$b$ indicating the display order "1" as to the selected player object OBJ in the player 1 data 710 of the already-selected-player data 702$d$. In a step S17, the selected player object OBJ is set to be unselectable, and the process proceeds to a step S47 shown in FIG. 16. In the step S17, the CPU 40 sets the data value of the bit corresponding to the selected player object to "1" in the selectable-player data 702$c$. This holds true for a case that the player object OBJ is made unselectable hereafter.

Figure 14:
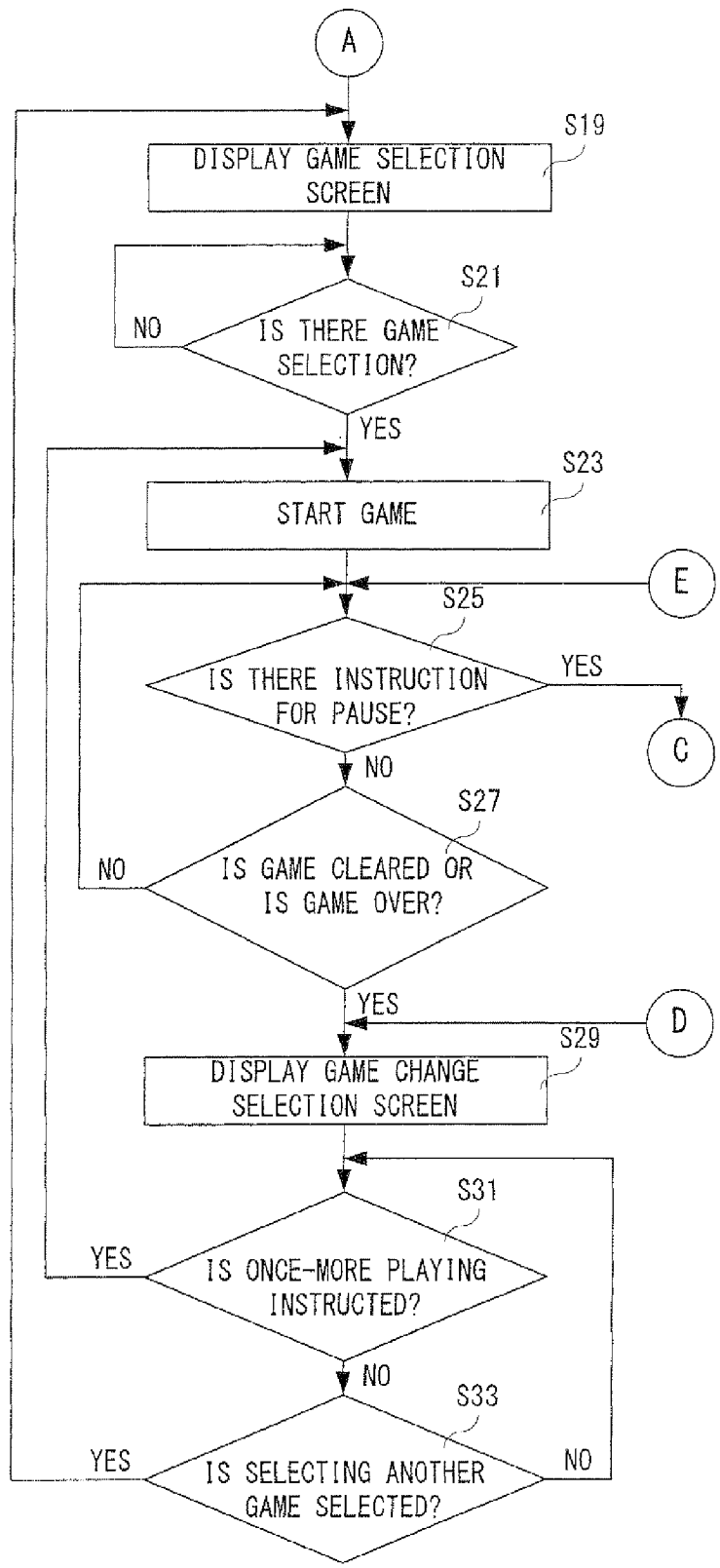
FIG. 14 is a flowchart showing a second part of the entire process of the CPU shown in FIG. 2 and sequel to FIG. 13.

As described above, when the playing by a single player is instructed, and the player is selected, the game selection screen 300 shown in FIG. 9(A) is displayed on the monitor 34 in the step S19 shown in FIG. 14. In a next step S21, it is determined whether or not there is a game selection. Here, it is determined whether or not any one of the button images 302-312 is turned on on the game selection screen 300.

If "NO" in the step S21, that is, if the game is not selected, the process returns to the step S21, as it is. On the other hand, if "YES" in the step S21, that is, if the game is selected, the selected game (1-6) is started in a step S23. Then, in a step S25, it is determined whether or not there is an instruction for pause. That is, the CPU 40 determines whether or not the + button 26$g$ is turned on. If "YES" in the step S25, that is, if there is a instruction for pause, the process proceeds to a step S35 shown in FIG. 15. On the other hand, if "NO" in the step S25, that is, if there is no instruction for pause, it is determined whether the game is cleared or the game is over in a step S27. That is, the CPU 40 determines whether or not the game is to be ended.

If "NO" in the step S27, that is, if the game is being played, the process returns to the step S25 as it is. On the other hand, if "YES" in the step S27, that is, if the game is cleared or the game is over, it is determined that the game is ended, and in a step S29, the game change selection screen 500 shown in FIG. 10(A) is displayed on the monitor 34. Then, in a next step S31, it is determined whether or not a once-more playing is instructed. That is, the CPU 40 determines whether or not the button image 504 is turned on on the game change selection screen 500.

If "YES" in the step S31, that is, if the button image 504 is turned on, it is determined that once-more playing is instructed, and the process returns to the step S23. Accordingly, the game (1-6) played directly before is started from the top. On the other hand, if "NO" in the step S31, that is, if the button image 504 is not turned on, it is determined that once-more playing is not instructed, and in a step S33, it is determined whether or not selecting another game is instructed. That is, the CPU 40 determines whether or not the button image 502 is turned on on the game change selection screen 500.

If "YES" in the step S33, that is, if the button image 502 is turned on, it is determined that the selecting another game is instructed, and the process returns to the step S19. On the other hand, if "NO" in the step S33, that is, if button image 502 is not turned on, it is determined that the selecting another game is not instructed, and the process returns to the step S31.

Figure 15:
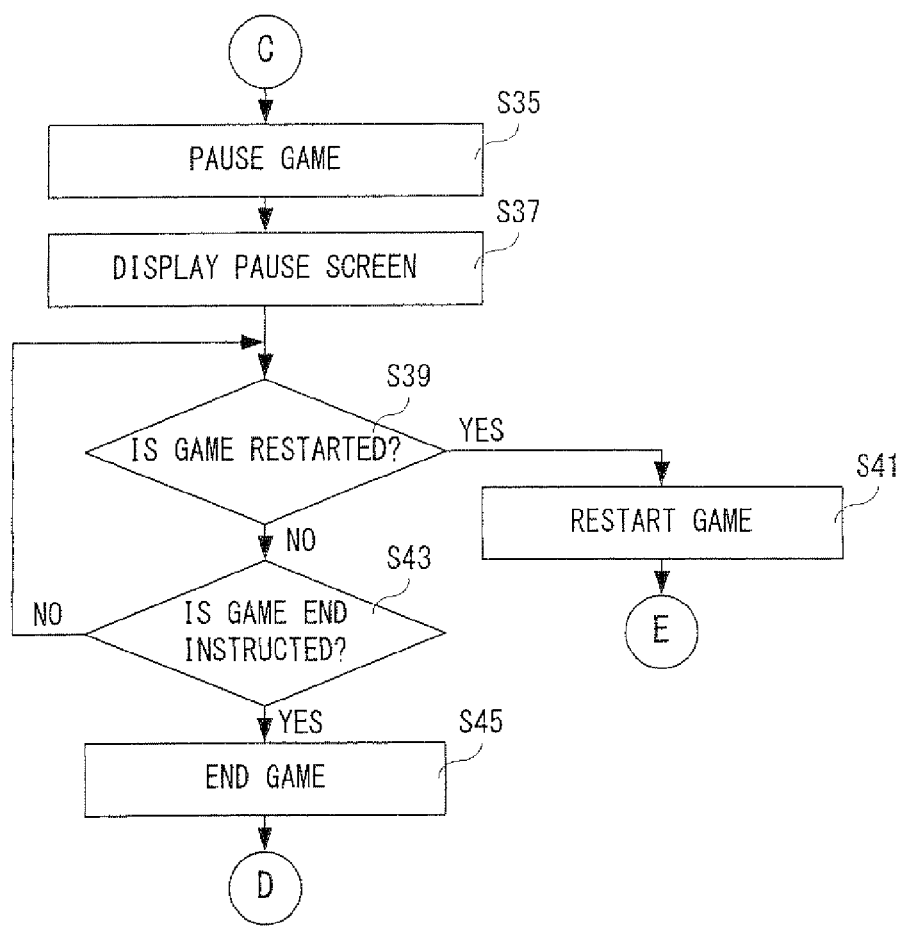
FIG. 15 is a flowchart showing a third part of the entire process of the CPU shown in FIG. 2 and sequel to FIG. 14.

Furthermore, as described above, if a pause is instructed, the game is paused in the step S35 shown in FIG. 15. In a next step S37, the pause screen 400 shown in FIG. 9(B) is displayed on the monitor 34. Succeedingly, in a step S39, it is determined whether or not restarting the game is instructed. That is, the CPU 40 determines whether or not the button image 402 is turned on, or the + button 26$g$ of the controller 22 is turned on.

If "YES" in the step S39, that is, if restarting the game is instructed, the game is restarted in a step S41, and the process returns to the step S25 shown in FIG. 14. On the other hand, if "NO" in the step S39, that is, if restarting the game is not instructed, it is determined whether or not a game end is instructed in a step S43. That is, the CPU 40 determines whether or not the button image 404 is turned on. If "NO" in the step S43, that is, if ending the game is not instructed, the process returns to the step S39 as it is. On the other hand, if "YES" in the step S43, that is, if ending the game is instructed, the game is ended (ended in proceeding) in a step S45, and the process proceeds to the step S29 shown in FIG. 14.

Figure 16:
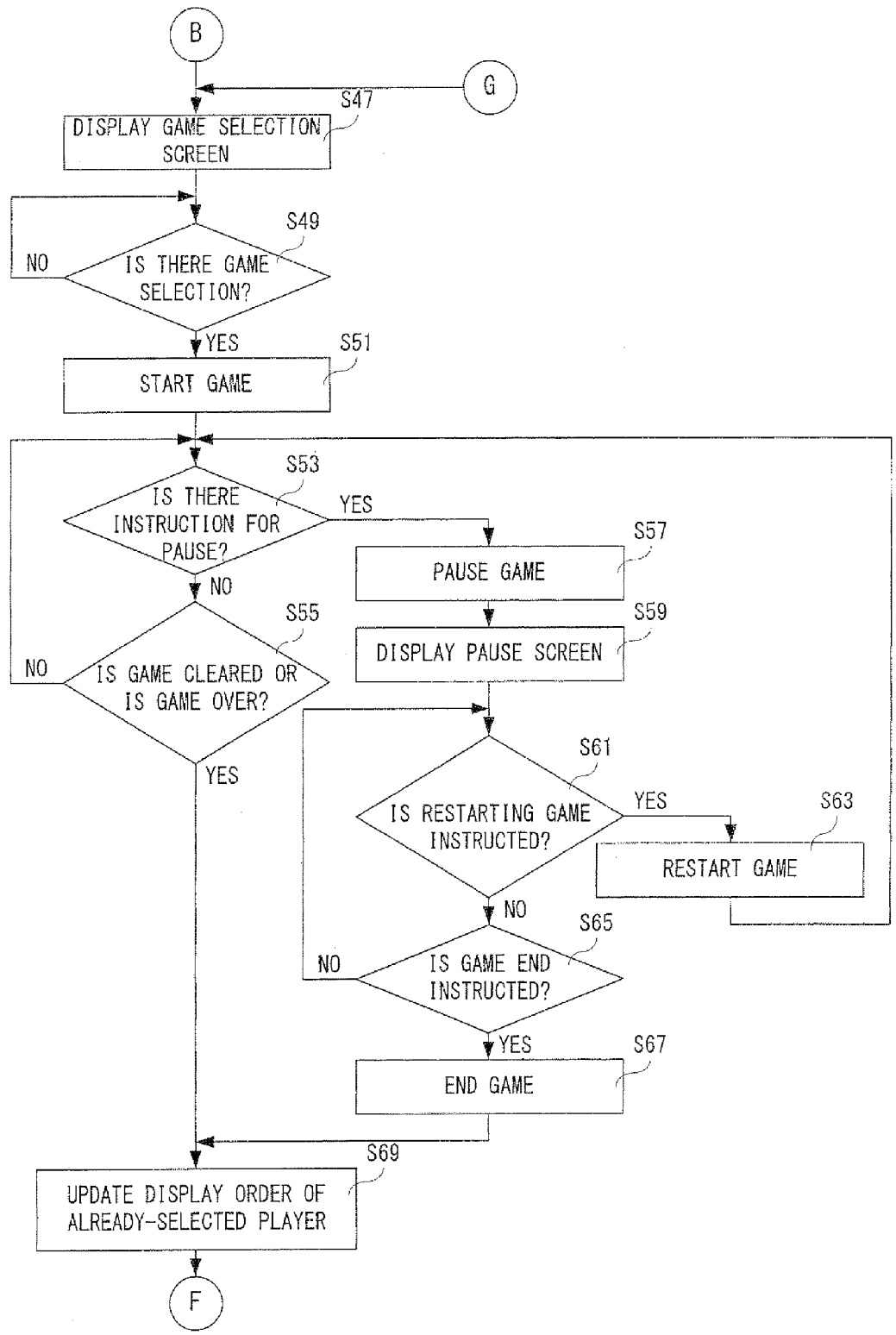
FIG. 16 is a flowchart showing a fourth part of the entire process of the CPU shown in FIG. 2 and sequel to FIG. 13.

As shown in FIG. 13, when the playing by all the players is instructed, the player is selected, the selected player is registered as an already-selected player, and the already-selected player is made unselectable on the player selection screen 200, processing after the step S47 shown in FIG. 16 is executed. The explanation is made below, but the processing the same as the playing by the single player is briefly explained.

As shown in FIG. 16, in the step S47, the game selection screen 300 shown in FIG. 9(A) is displayed on the monitor 34. In a next step S49, it is determined whether or not there is a game selection. If "NO" in the step S49, the process returns to the same step S49 while if "YES" in the step S49, the selected game (1-6) is started in a step S51. In a next step S53, it is determined whether or not there is an instruction for pause. If "NO" in the step S53, it is determined whether or not the game is to be cleared or the game is over in a step S55. If "NO" in the step S55, the process returns to the step S53 as it is. On the other hand, if "YES" in the step S55, the process proceeds to a step S69.

Furthermore, if "YES" in the step S53, the game is paused in a step S57, and the pause screen 400 shown in FIG. 9(B) is displayed on the monitor 34 in a step S59. In a next step S61, it is determined whether or not restarting the game is instructed. If "YES" in the step S61, the game is restarted in a step S63, and the process returns to the step S53. On the other hand, if "NO" in the step S61, it is determined whether or not the game end is instructed in a step S65. If "NO" in the step S65, the process returns to the step S61 as it is. On the other hand, if "YES" in the step S65, the game is ended in a step S67, and the process proceeds to the step S69.

In the step S69, the display order of the already-selected player is updated. In this embodiment, the display order data except for NULL data is updated such that the display order of the already-selected player (player object OBJ) who plays the game directly before is regarded as "1", and the display orders of the other already-selected players are arranged in early order at time by which a previous game is played. Here, there are some players whose display order is not changed. When the already-selected player is three, if the already-selected player having the display order of "2" plays the game directly before, the display order of the already-selected player having the display order of "2" is changed to "1", and the display order of the already-selected player having the display order of "1" is changed to "2". Here, with respect to the player having the display order of "3", the display order is not changed. As described later, if a new already-selected player is added, the display order is set (changed) to "1" after the new already-selected player ends the game, and therefore, the display order of each of the already-selected player which has already been registered is added by one.

Figure 17:
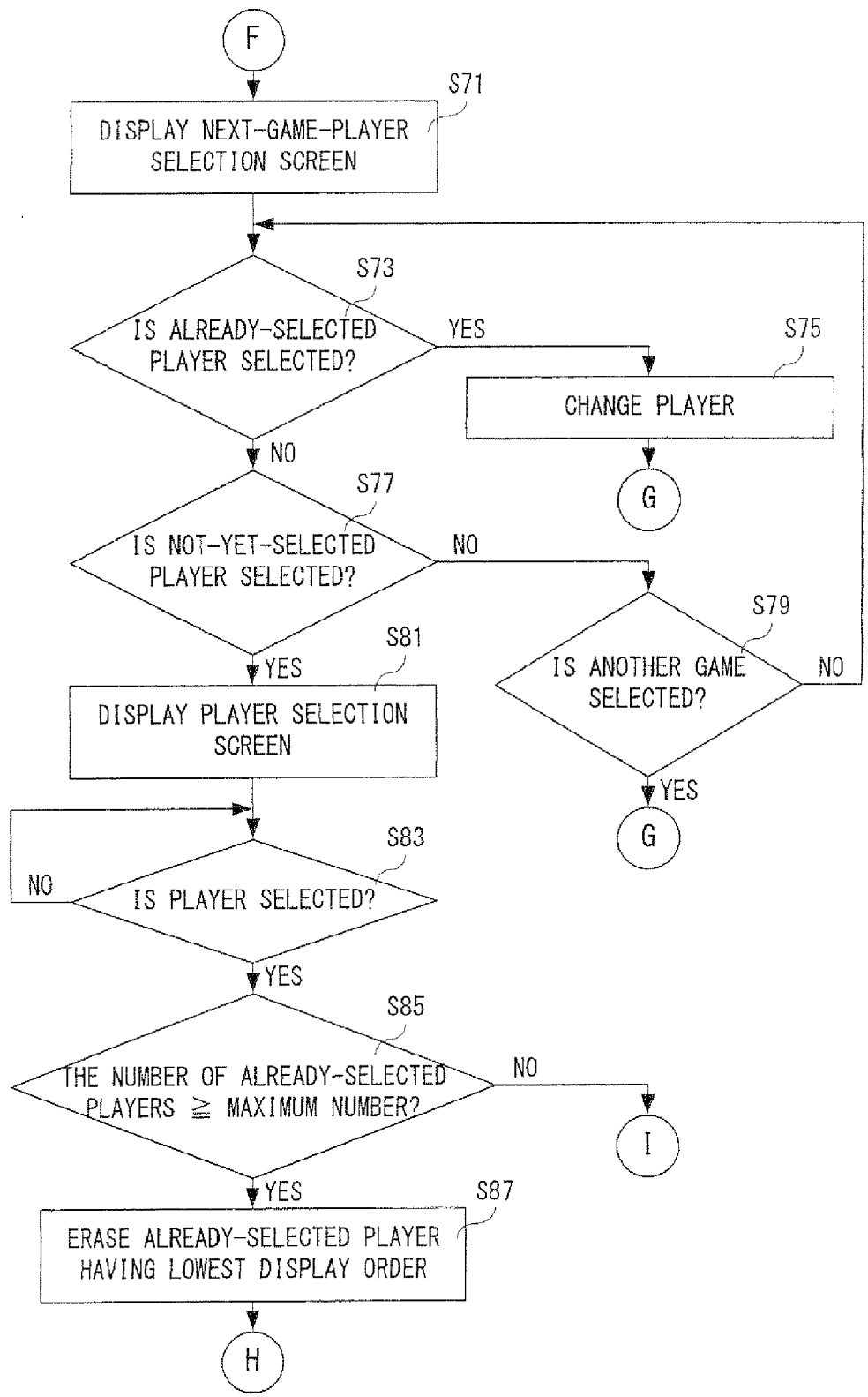
FIG. 17 a flowchart showing a fifth part of the entire process of the CPU shown in FIG. 2 and sequel to FIG. 16.

As shown in FIG. 17, in a succeeding step S71, the next-game-player selection screen 600 shown in FIG. 10(B) is displayed on the monitor 34. In a next step S73, it is determined whether or not the already-selected player is selected. That is, the CPU 40 determines whether or not the image of any one of the player objects OBJ displayed on the display region 602 is turned on (selected).

If "YES" in the step S73, that is, if the already-selected player is selected, the player is changed in a step S75, and the process returns to the step S47 shown in FIG. 16. Here, if the image of the player object OBJ the same as the player object OBJ which plays the game directly before is selected, the player is not changed. On the other hand, if "NO" in the step S73, that is, if the already-selected player is not selected, it is determined whether or not selecting the not-yet-selected player is instructed in a step S77. That is, the CPU 40 determines whether or not the not-yet-selected player selection image 610 displayed in the display region 602 is turned on (selected).

If "NO" in the step S77, that is, if selecting the not-yet-selected player is not instructed, it is determined whether or not selecting another game is instructed in a step S79. That is, the CPU 40 determines whether or not the button image 604 is turned on. If "NO" in the step S79, that is, if selecting another game is not selected, the process returns to the step S73 as it is. On the other hand, if "YES" in the step S79, that is, if selecting another game is instructed, the process returns to the step S47 as it is. That is, another game (1-6) is selected without the player being changed.

On the other hand, if "YES" in the step S77, that is, if selecting the not-yet-selected player is instructed, the player selection screen 200 shown in FIG. 8(B) is displayed on the monitor 34 in a step S81. Here, the registered already-selected player is unselectable, and is not displayed on the player selection screen 200. In a next step S83, it is determined whether or not a player is selected.

If "NO" in the step S83, the process returns to the same step S83. On the other hand, if "YES" in the step S83, it is determined whether or not the number of already-selected players is equal to or more than a maximum number (9 in this embodiment) in a step S85. If "NO" in the step S85, that is, if the number of already-selected players is less than the maximum number, the process proceeds to a step S91 shown in FIG. 18 as it is. On the other hand, if "YES" in the step S85, that is, if the number of already-selected players is equal to or more than the maximum number, the already-selected player having the lowest display order is erased in a step S87, and the process proceeds to a step S89 shown in FIG. 18. That is, in the step S87, the CPU 40 writes NULL data to the identification information data and the display order data of the player n data 7n0 having the display order data of "9".

In the step S89 shown in FIG. 18, the erased already-selected player is set to be selectable. That is, the CPU 40 sets the data value "0" in the bit corresponding to the erased already-selected player (player object OBJ) in the selectable-player data 702c. In the next step S91, the selected player object OBJ (not-yet-selected player) is registered as an already-selected player. Here, in the empty player n data 7n0 (where the NULL data is written) out of the already-selected-player data 702d, the identification information data and the display order data of the player object OBJ selected by utilizing the player selection screen 200 displayed in the step S81 are registered. It should be noted that the display order of the already-selected player currently registered is updated after the end of the game as to the already-selected player (step S69), and thus is set to the lowest rank here. Then, in a step S93, the selected player object OBJ, that is, the player object registered as an already-selected player is made unselectable, and the process returns to the step S47.

According to this embodiment, in a case of playing a game by two or more players, when the game is ended, the not-yet-selected player is made selectable as a player for the next game as well as the registered already-selected player is selected as a player for the next game, and moreover, the not-yet-selected player selected as a player for the next game is registered as an already-selected player, and therefore, a player can be added without restarting the game program of the main game. That is, it is possible to improve degree of flexibility when a player is participated in the game.

Additionally, in this embodiment, in a case of playing the game by two or more players, the player is changed after end of the game, but the player may be changed in a state that the game is paused, that is, without ending the game. In such a case, a button image to select another player is provided on the pause screen, and when the button image to select another player is turned on, a next-game-player selection screen on which the button image to select another game is not displayed (or where the button image to select another game is set so as not to be turned on) is displayed, and after end of selecting another player, the game is restarted from the paused state. Or, after selecting another player, the game may be started from the top.

Furthermore, in this embodiment, the explanation is made only on the console typed game apparatus separately provided from the monitor, but there is no need of being restricted thereto. A PC having a game function may be applicable. In addition, a hand-held typed game apparatus integrally provided with the monitor, a PDA and a laptop each having a game function, a cellular phone having a game function, an arcade game machine, etc. may be applicable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a game program causing a computer to perform functionality comprising:
   selecting a game player according to an operation by a player;
   registering at least the selected player as an already-selected player;
   executing a game as to the selected player; and
   selecting, when the executed game is ended, prior to finishing execution of the overall game program and a next game is started, a player for said next game from the already-selected player who has been registered and a not-yet-selected player who has not yet been selected according to an operation by the player, wherein
   when the not-yet-selected player is selected by said next-game-player selecting step, said not-yet-selected player is registered as said already-selected player.

2. The non-transitory storage medium storing a game program according to claim 1, said game program causes the computer to further perform functionality comprising:
   determining whether or not the number of already-selected players is a maximum number when said not-yet-selected player is registered as the already-selected player; and
   erasing said one already-selected player from said registered already-selected player according to a first predetermined rule when the number of already-selected players is the maximum number.

3. The non-transitory storage medium storing a game program according to claim 2, wherein
   said already-selected player having the oldest playing time of a previous game is erased from said registered already-selected player when the number of already-selected players is the maximum number.

4. The non-transitory storage medium storing a game program according to claim 1, said game program causes the computer to further perform functionality comprising displaying a next-game-player selection screen to select the player for said next game from said already-selected player or said not-yet-selected player when the executed game is ended.

5. The non-transitory storage medium storing a game program according to claim 4, wherein
   said game player selection screen includes a first image to select said already-selected player and a second image to select said not-yet-selected player, and
   said game program causes the computer to further perform functionality comprising displaying a not-yet-selected-player selection screen to select said not-yet-selected player when said second image is selected, and
   selecting the not-yet-selected player selected according to an operation by said player as the player for said next game by utilizing the displayed said not-yet-selected-player selection screen.

6. The non-transitory storage medium storing a game program according to claim 5, wherein
   selectable-player data as to a selectable player which has previously been registered is stored in a storing unit, and
   an image corresponding to the selectable player indicated by the selectable-player data stored in said storing unit is displayed as the not-yet-selected player on said not-yet-selected-player selection screen.

7. The non-transitory storage medium storing a game program according to claim 6, the game program causes the computer to further perform functionality comprising:
   making the selected player and the selected not-yet-selected player unselectable out of said selectable player; and
   displaying on said not-yet-selected-player selection screen an image corresponding to said selectable player except for the player who is made unselectable.

8. The non-transitory storage medium storing a game program according to claim 5, wherein
   said first image includes already-selected-player images each corresponding to said already-selected player,
   said already-selected-player images are arranged and displayed in an order according to a second predetermined rule, and
   the game program causes said computer to further perform functionality comprising sorting said already-selected-player images according to said second predetermined rule when the executed game.

9. The non-transitory storage medium storing a game program according to claim 8, wherein
   said already-selected-player images are displayed in early order at time by which a previous game is played.

10. The non-transitory storage medium storing a game program according to claim 1, wherein
    selectable-player data as to a selectable player which has already been registered is stored in a storing unit,
    a player is selected from said selectable player, and
    the not-yet-selected player is selected from said selectable player.

11. A game apparatus, comprising:
    a player selecting unit for selecting a game player according to an operation by a player;
    a player registering unit for registering at least the player selected by said player selecting unit as an already-selected player;
    a game executing unit for executing a game as to the player selected by said player selecting unit; and
    a next-game-player selecting unit for selecting, when the game executed by said game executing unit is ended, prior to finishing execution of the overall game program and a next game is started, a player for said next game from the already-selected player who has been registered by said player registering unit and a not-yet-selected player who has not yet been selected by said player selecting unit according to an operation by the player, wherein
    said player registering unit registers, when the not-yet-selected player is selected by said next-game-player selecting unit, said not-yet-selected player as said already-selected player.

12. A game controlling method, comprising:
    selecting a game player according to an operation by a player;
    registering at least the selected player as an already-selected player;
    executing a game as to the selected player; and
    selecting, when the executed game is ended, prior to finishing execution of the overall game program and a next game is started, a player for said next game from the already-selected player who has been registered and a not-yet-selected player who has not yet been selected according to an operation by the player, wherein
    when the not-yet-selected player is selected, said not-yet-selected player is registered as said already-selected player.

13. A game system, comprising:
an input device for selecting a game player; and
a game apparatus operatively associated with the input device, the game apparatus comprising:
- a player selecting unit for selecting a game player according to an operation by a player,
- a player registering unit for registering at least the player selected by said player selecting unit as an already-selected player,
- a game executing unit for executing a game as to the player selected by said player selecting unit, and
- a next-game-player selecting unit for selecting, when the game executed by said game executing unit is ended, prior to finishing execution of the overall game program and a next game is started, a player for said next game from the already-selected player who has been registered by said player registering unit and a not-yet-selected player who has not yet been selected by said player selecting unit according to an operation by the player, wherein
- said player registering unit registers, when the not-yet-selected player is selected by said next-game-player selecting unit, said not-yet-selected player as said already-selected player.

* * * * *